(12) United States Patent
Bullock et al.

(10) Patent No.: US 6,691,028 B2
(45) Date of Patent: Feb. 10, 2004

(54) SERVER-BASED NAVIGATION SYSTEM AND METHOD OF OPERATING SAME

(75) Inventors: James Blake Bullock, Gilbert, AZ (US); Rafael A. Saavedra, Chandler, AZ (US); Jeffrey Solomon, Flitwick (GB); Patrick Luffman, Clapham (GB)

(73) Assignees: Motorola, Inc., Schaumburg, IL (US); Trafficmaster, Bedfordshire (GB)

( * ) Notice: Subject to any disclaimer, the term of this patent is extended or adjusted under 35 U.S.C. 154(b) by 0 days.

(21) Appl. No.: 10/453,003

(22) Filed: Jun. 3, 2003

(65) Prior Publication Data

US 2003/0229444 A1 Dec. 11, 2003

Related U.S. Application Data

(60) Provisional application No. 60/387,271, filed on Jun. 7, 2002.

(51) Int. Cl.[7] ............................................. G01C 21/34
(52) U.S. Cl. ..................... 701/202; 701/209; 701/211; 340/995.12; 340/995.2
(58) Field of Search ............................. 701/202, 209, 701/210, 211; 340/995.12, 995.13, 995.19, 995.2, 996

(56) References Cited

U.S. PATENT DOCUMENTS

| | | |
|---|---|---|
| 4,951,212 A | 8/1990 | Kurihara et al. |
| 5,131,020 A | 7/1992 | Liebesny et al. |
| 5,172,321 A | 12/1992 | Ghaem et al. |
| 5,369,588 A | 11/1994 | Hayami et al. |
| 5,774,827 A | 6/1998 | Smith, Jr. et al. |
| 5,892,463 A | 4/1999 | Hikita et al. |
| 5,911,773 A | 6/1999 | Mutsuga et al. |
| 5,933,100 A | 8/1999 | Golding |
| 5,948,042 A | 9/1999 | Heimann et al. |
| 6,023,241 A | 2/2000 | Clapper |
| 6,211,798 B1 | 4/2001 | Albrecht et al. |
| 6,212,470 B1 | 4/2001 | Seymour et al. |
| 6,212,472 B1 | 4/2001 | Nonaka et al. |
| 6,216,086 B1 | 4/2001 | Seymour et al. |
| 6,263,276 B1 * | 7/2001 | Yokoyama et al. ......... 701/207 |
| 6,275,585 B1 | 8/2001 | Ablay et al. |
| 6,278,939 B1 * | 8/2001 | Robare et al. .............. 701/208 |
| 6,278,941 B1 * | 8/2001 | Yokoyama ................... 701/209 |
| 6,529,826 B2 * | 3/2003 | Kawai et al. ................ 701/211 |
| 6,542,816 B1 * | 4/2003 | Ito et al. ..................... 701/209 |
| 2002/0027511 A1 * | 3/2002 | Horita et al. ................ 340/988 |
| 2002/0111737 A1 * | 8/2002 | Hoisko ........................ 701/209 |

FOREIGN PATENT DOCUMENTS

| | | |
|---|---|---|
| EP | 0 756 153 A2 | 1/1997 |
| EP | 0 883 871 B1 | 9/2002 |
| EP | 0 756 153 B1 | 11/2002 |
| EP | 1 262 936 A1 | 12/2002 |

\* cited by examiner

*Primary Examiner*—Gary Chin
(74) *Attorney, Agent, or Firm*—Thomas V. Miller; Brian M. Mancini

(57) ABSTRACT

A navigation system (20) having a service center (24) and a navigation unit (22) and a method of transmitting data to reduce the complexity of the navigation unit (22) and minimize the transmitted data. The navigation unit (22) transmits (202) a current location (or starting point (102)) and a desired destination (or destination point (104)). The service center (24) receives (204) the starting point and the destination point and selects (206) a route (100) between the two points. The service center (24) then generates (210, 212, 214) and transmits (216) data associated with a plurality of points on the selected route (100). These points may include items such as preparation points (140, 142, 144, 146), warning points (130, 132, 134, 136), instruction points (120, 122, 124, 126) and confirmation points (150, 152, 154, 156, 160, 162, 164, 166). The navigation unit (22) receives the data associated with points and uses the data to prepare, warn, instruct and confirm that the user of the navigation unit (22) is correctly traversing to the desired destination point (104).

51 Claims, 10 Drawing Sheets

| NUMBER (i) | POINT TYPE | COORDINATES | TOKEN NUMBERS | | | |
|---|---|---|---|---|---|---|
| 1 | PP | $x_1, y_1$ | 5 | 2 | 4 | 9 |
| 2 | WP | $x_2, y_2$ | 4 | 8 | 2 | 0 |
| 3 | IP | $x_3, y_3$ | 1 | 2 | 0 | 0 |
| 4 | C1 | $x_4, y_4$ | 0 | 0 | 0 | 0 |
| 5 | C2 | $x_5, y_5$ | 7 | 11 | 0 | 0 |
| 6 | PP | $x_6, y_6$ | 5 | 3 | 4 | 9 |
| 7 | WP | $x_7, y_7$ | 4 | 8 | 3 | 0 |
| 8 | IP | $x_8, y_8$ | 1 | 3 | 0 | 0 |
| 9 | C1 | $x_9, y_9$ | 0 | 0 | 0 | 0 |
| 10 | C2 | $x_{10}, y_{10}$ | 7 | 15 | 0 | 0 |
| 11 | PP | $x_{11}, y_{11}$ | 5 | 3 | 4 | 9 |
| 12 | WP | $x_{12}, y_{12}$ | 4 | 8 | 3 | 0 |
| ⋮ | ⋮ | ⋮ | ⋮ | ⋮ | ⋮ | ⋮ |
| 25 | DP | $x_{25}, y_{25}$ | 6 | 0 | 0 | 0 |

*FIG. 6*

| TOKEN NUMBERS | WORD/PHRASE |
|---|---|
| 0 | (NONE) |
| 1 | PLEASE |
| 2 | TURN RIGHT |
| 3 | TURN LEFT |
| 4 | IN |
| 5 | PREPARE TO |
| 6 | YOU ARE ARRIVING AT YOUR DESTINATION |
| 7 | CONTINUE TO FOLLOW THE ROAD FOR |
| 8 | 250 METERS |
| 9 | 500 METERS |
| 10 | 750 METERS |
| 11 | 1000 METERS |
| ⋮ | ⋮ |

*FIG. 7*

| POINT TYPE | COORDINATES | TOKEN NUMBERS | | | |
|---|---|---|---|---|---|
| DP | $x_1,y_1$ | 6 | 0 | 0 | 0 |
| IP | $x_2,y_2$ | 1 | 2 | 0 | 0 |
| IP | $x_3,y_3$ | 1 | 3 | 0 | 0 |
| IP | $x_4,y_4$ | 1 | 3 | 0 | 0 |
| IP | $x_5,y_5$ | 1 | 3 | 0 | 0 |
| WP | $x_6,y_6$ | 4 | 8 | 2 | 0 |
| WP | $x_7,y_7$ | 4 | 8 | 3 | 0 |
| WP | $x_8,y_8$ | 4 | 8 | 3 | 0 |
| WP | $x_9,y_9$ | 4 | 8 | 3 | 0 |
| PP | $x_{10},y_{10}$ | 5 | 2 | 4 | 9 |
| PP | $x_{11},y_{11}$ | 5 | 3 | 4 | 9 |
| PP | $x_{12},y_{12}$ | 5 | 3 | 4 | 9 |
| ⋮ | ⋮ | ⋮ | ⋮ | ⋮ | ⋮ |

*FIG. 9*

SERVER-BASED NAVIGATION SYSTEM AND METHOD OF OPERATING SAME

REFERENCE(S) TO RELATED APPLICATION(S)

The present application claims priority from provisional application, Ser. No. 60/387,271, entitled "SERVER-BASED NAVIGATION SYSTEM AND METHOD OF OPERATING SAME", filed Jun. 7, 2002, which is commonly owned and incorporated herein by reference in its entirety.

FIELD OF THE INVENTION

This invention in general relates to a server-based navigation system and method of transmitting navigation data to a navigation unit and, more particularly, to a system and method that reduces the complexity of the unit and minimizes the data transmitted to the unit.

BACKGROUND OF THE INVENTION

Devices that provide navigation guidance to a driver in a vehicle are well known. In conventional systems, a navigation unit is installed in the vehicle. The navigation unit typically has an interactive visual screen or buttons that allows a driver to enter a desired destination location. The navigation unit has memory or a CD drive that keeps map data and a processor that generates routes based on the map data and desired destination. Conventional navigation units having map data and map generation processors are expensive. They also require a user to update the map data and do not permit the unit to select a route based on other considerations such as current traffic patterns or delays.

There has been increasing interest in server-based navigation systems. A server-based navigation system typically downloads map information to a navigation unit by a wireless communication. The downloaded information contains the topology or other attribute information much like the original map information. The downloaded information can become quite large and may conflict with available bandwidth. Additionally, such systems still require excessive computations to be done by the navigation unit, increasing the complexity and cost of the navigation unit.

There is a need to reduce the computation complexity in a navigation unit. Reducing the computational complexity of the navigation unit reduces the cost of electronics required to perform vehicle navigation. Additionally, there is a need to decrease or minimize the amount of data transmitted to a navigation unit. Decreasing or minimizing the amount of data transmitted to the navigation unit allows the unit to respond quicker and reduces data usage and cost for the wireless communications.

It is, therefore, desirable to provide an improved navigation system and method to overcome or minimize most, if not all, of the preceding problems.

BRIEF DESCRIPTION OF THE DRAWINGS

FIG. 6 illustrates one embodiment of how data received from the service center may be stored in the navigation unit.

FIG. 7 illustrates one embodiment of how pre-recorded voice or text messages may be stored and accessed in the navigation unit.

FIG. 9 illustrates another embodiment of how data received from the service center may be stored in the navigation unit.

Figure 1:
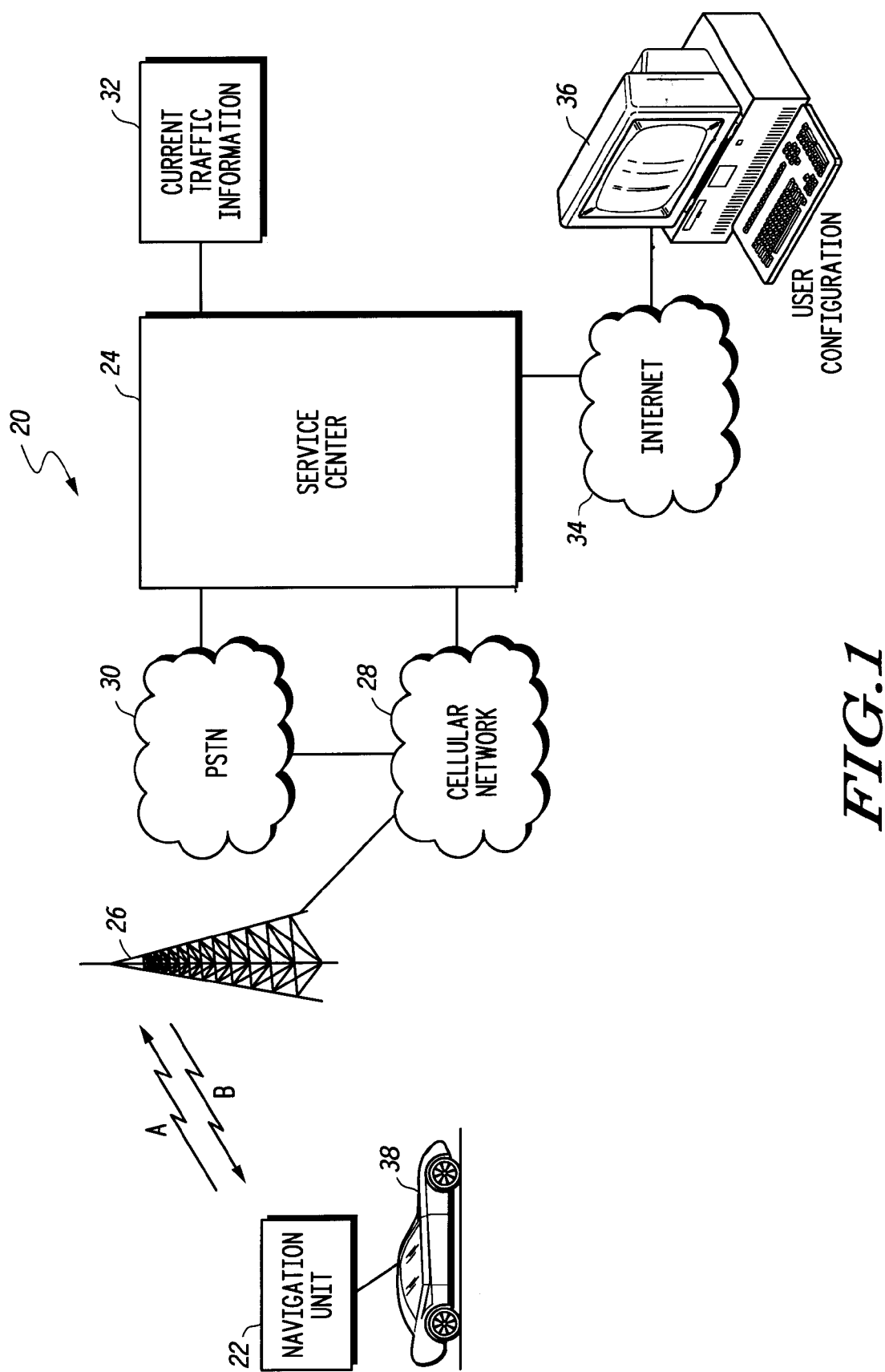
FIG. 1 is a top-level block diagram of one embodiment of a navigation system of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is server-based navigation system and method of transmitting navigation data to a navigation unit. The system and method reduces the complexity of the navigation unit and minimizes the data transmitted to the unit.

To this end, in one embodiment there is a navigation system having a service center and a navigation unit. The navigation unit transmits a current location (or starting point) and a desired destination (or destination point). The service center receives the starting point and the destination point and selects a route between the two points. The service center then generates and transmits data associated with a plurality of points on the selected route. These points may include items such as preparation points, warning points, instruction points and confirmation points. The navigation unit receives the data associated with points and uses the data to prepare, warn, instruct and confirm that the user of the navigation unit is correctly traversing to the desired destination.

The data associated with each point may include a set of coordinates reflecting the location of the points. The data associated with at least some of the points (such as the preparation points, warning points and instruction points) may further include a message that can be outputted to the user of the navigation unit. In one embodiment, the message is represented by token numbers that the navigation unit can use to recall pre-recorded words and phrases. When the words and phrases are combined, they form a message that is provided to the user when the navigation unit falls within a predetermined radius of the set of coordinates for a particular point. Other data may include the type of maneuver, a road heading, a sequence number, a street name, or a graphic representation of the maneuver associated with a point.

The confirmation points may include a first confirmation point and a second confirmation point. In one embodiment, the first confirmation point is positioned on the selected route before an upcoming maneuver and the second confirmation point is positioned on the selected route after an upcoming maneuver. The service center generates data associated with these confirmation points and the navigation unit may use the data in order to confirm that the navigation unit successfully completed a maneuver. In another embodiment, the first confirmation point is positioned on the selected route before an intersection where there is an opportunity for the user of the navigation unit to leave the route. The second confirmation point is positioned on the route after the same intersection. The service center generates data associated with these confirmation points and the navigation unit uses that data to confirm that the navigation unit has not left the route at the intersection.

In another embodiment, there is a method in a navigation system for sending data from a service center to a navigation unit. The method includes the steps of: sending data associated with a first set of points along a selected route, the first set of points reflecting warnings of upcoming maneuvers along the selected route; sending data associated with a second set of points along a selected route, the second set of points reflecting instructions of upcoming maneuvers along the selected route; and sending data associated with a third set of points along the selected route, the third set of points reflecting confirmations of maneuvers along the selected route. The method may further include a step of sending data associated with a fourth set of points along the selected route, the fourth set of points reflecting preparations of maneuvers along the selected route. The method may also include a step of sending data associated with a destination point, the data associated with the destination point including at least an identification of the type of point and a set of coordinates reflecting the location of the destination point.

In a further embodiment, there is a method in a navigation system that has a service center and a navigation unit. The method may include the steps of: sending a starting point and a destination point from the navigation unit to the service center; selecting in the service center a route for the navigation unit based on the starting point; generating data in the service center associated with a first set of points on the route that correspond to warnings of maneuvers along the route; generating data in the service center associated with a second set of points on the route that correspond to instructions of maneuvers along the route; generating data in the service center associated with a third set of points on the route that correspond to confirmations of maneuvers along the route; and sending data associated with the first, second, and third sets of points from the service center to the navigation unit. The method may further include the steps of generating data in the service center associated with a fourth set of points on the route that correspond to preparations of maneuvers along the route and sending the data associated with the fourth set of points from the service center to the navigation unit. The method may also include the steps of generating data in the service center associated with the destination point and sending the data associated with the destination point from the service center to the navigation unit.

Another embodiment includes a method in a service center of a navigation system. The method may include the steps of: receiving a starting point and a destination point from a navigation unit; selecting a route for the navigation unit based on the starting point and the destination point; generating data associated with a first set of point on the route that correspond to warnings of maneuvers along the route; generating data associated with a second set of points on the route that correspond to instructions of maneuvers along the route; generating data associated with a third set of points that correspond to confirmations of maneuvers along the route; and sending data associated with the first, second, and third sets of points to the navigation unit. This method may further include the steps of generating data associated with a fourth set of points on the route that correspond to preparations of maneuvers along the route and sending the data associated with the fourth set of points to the navigation unit. The method may also include the steps of generating data associated with the destination point and sending the data associated with the destination point to the navigation unit.

In another embodiment, there is a navigation unit for use in a navigation system, the navigation unit includes a wireless communication device, a first memory, a second memory, an output, a microcomputer and a global positioning system module. The wireless communication device is used to transmit a starting point and a destination point to a service center. The wireless communication device is also used to receive data from the service center that is associated with a plurality of points. The plurality of points include a set of warning points, a set of instruction points, and a set of confirmation points. The first memory is used to store the data associated with the plurality of points. The data associated with each point includes a set of coordinates reflecting the location of the point. The second memory is used to store pre-recorded messages and the output is used to present the pre-recorded messages to the user of the navigation unit. The global positioning system module determines the current location of the navigation unit. The microcomputer processes the data associated with the plurality of points. For instance, the microcomputer is capable of comparing the current location of the navigation unit with each set of coordinates for the points. Based on this comparison, when the current location of the navigation unit reaches within a predetermined radius of the coordinates of a particular point, the microcomputer may access the second memory and provided a message through the output to the user of the navigation unit.

Navigation System 20

Now, turning to the drawings, FIG. 1 illustrates a top-level block diagram of a navigation system 20 for the present invention. Generally, the navigation system 20 includes a navigation unit 22 and a service center 24. The service center 24 and the navigation unit 22 are described further below in relation to FIGS. 2 and 5, respectively.

Referring initially to FIG. 1, in the navigation system 20, the navigation unit 22 and the service center 24 may communicate with each other via wireless communications. The wireless communications are illustrated in FIG. 1 by communication arrows A and B. The communications between the navigation unit 22 and the service center 24 will now be described generally although a more detailed description is provided after the general discussion.

Generally, in one embodiment, the navigation unit 22 transmits its current location (or starting point) and desired location (or destination point) to the service center 24 via communication A. As shown in FIG. 1, in one embodiment, the communication A is a cellular wireless communication that is transmitted to a base station antenna 26, through a cellular network 28 and a public switched telephone network (PSTN) 30, and to the service center 24. The transmission of the destination point to the service center 24 may be a voice call to an operator at the service center 24 that is initiated by the user of the navigation unit 22. The starting point may be transmitted during the voice call or determined by a global positioning system (GPS) module in the navigation unit 22 and transmitted separately. Alternatively, the transmission of the starting point and destination point to the service center 24 may be a data transmission manually or otherwise entered by the user of the navigation unit 22.

Those of ordinary skill in the art, having the benefit of this disclosure, will appreciate that many possible wireless communication methods may be used for communications from the navigation unit 22 to the service center 24. In one embodiment, the communications are via a cellular wireless communication such as AMPS, CDMA, GSM or TDMA. The transmission from the navigation unit 22 to the service center 24 may also be made by other wireless communications such as a satellite communications.

In response to receiving the starting point and destination point from the navigation unit 22, the service center 24 selects a route and determines a variety of points along the route. As will be described in more detail below, the determined points along the route may include preparation points, warning points, instruction points, and confirmation points.

The service center 24 has a server that uses digital map data to select a route. The service center 24 may also be configured to receive current traffic information 32 from a service provider or other current traffic source. In that case, the selected route may also include a consideration for current traffic patterns. After selecting a route, the server then determines various points along the route to help prepare, warn, and instruct the user toward the destination point as well as confirm that the user is proceeding correctly to the destination. These points will be referred herein as preparation points, warning points, instruction points, and confirmation points.

The server in the service center 24 generates data associated with each determined point. In one embodiment, the generated data for each point may include a set of coordinates and a voice or text message to be outputted to the user of the navigation unit 22. These voice or text messages may be outputted to the user of the navigation unit 22 when the unit comes within a predetermined radius of the set of coordinates. Additionally, the data generated by the server for some or all the points may further include an identification of the type of point. Data associated with each point is encoded and then transmitted by the service center 24 to the navigation unit 22 by communication B. In the preferred embodiment, the service center 24 does not transmit the route topology or the route itself. Instead, the service center 24 simply transmits data associated with certain points (such as the preparation points, warning points, instruction points, confirmation points, and a destination point).

As shown in FIG. 1, in one embodiment, the communication B is a cellular wireless communication that is sent through the public switched telephone network (PSTN) 30 and cellular network 28 and transmitted by the base station antenna 26 to the navigation unit 22. Again, those of ordinary skill in the art, having the benefit of this disclosure, will appreciate that many possible wireless communication methods may be used for communications from the service center 24 to the navigation unit 22. In one embodiment, the communication is via a digital cellular wireless communication such as CDMA, GSM or TDMA. The transmission from the service center 24 to the navigation unit 22 may also be made by other wireless communications such as a satellite communications.

Generally, the navigation unit 22 consists of a wireless communication module and antenna for transmitting and receiving wireless voice and data communications to and from the service center 24. The navigation unit 22 may further include a microcomputer for performing the main functions of processing the various points received from the service center 24. The navigation unit 22 uses its GPS module to understand the unit's current position in relation to the set of coordinates associated with each downloaded point. The navigation unit 22 further has a speech processor for playing pre-recorded words and phrases that may be associated with each downloaded point. Alternatively, or in addition to the speech processor, the navigation unit 22 may have a text message screen to display any words or phrases that may be associated with each downloaded point. As the navigation unit 22 translates along a route, the navigation unit 22 uses voice words and phrases or text messages to prepare, warn, and instruct the user of maneuvers to reach a desired destination point as well as confirm that the user is properly progressing to the destination point.

Additionally, the navigation system 20 may be set up to allow a user of a navigation unit 22 to access the service center 24 via the Internet 34 and a remote device 36. From the remote device 36, a user can customize route selection and tracking information. For example, from remote device 36, the user could require that route selection include or not include the consideration of current traffic information. Moreover, from remote device 36, the user could select the type of data and information downloaded from the service center 24 to the navigation unit 22. This may include the desire to have additional preparation or warning points or remove certain downloaded points. This may also include the selection, activation or deactivation of certain preferred voice or text messages. The connection to the service center 24 may also be configured to allow the user to access user profile information and billing information records.

Service Center 24

Figure 2:
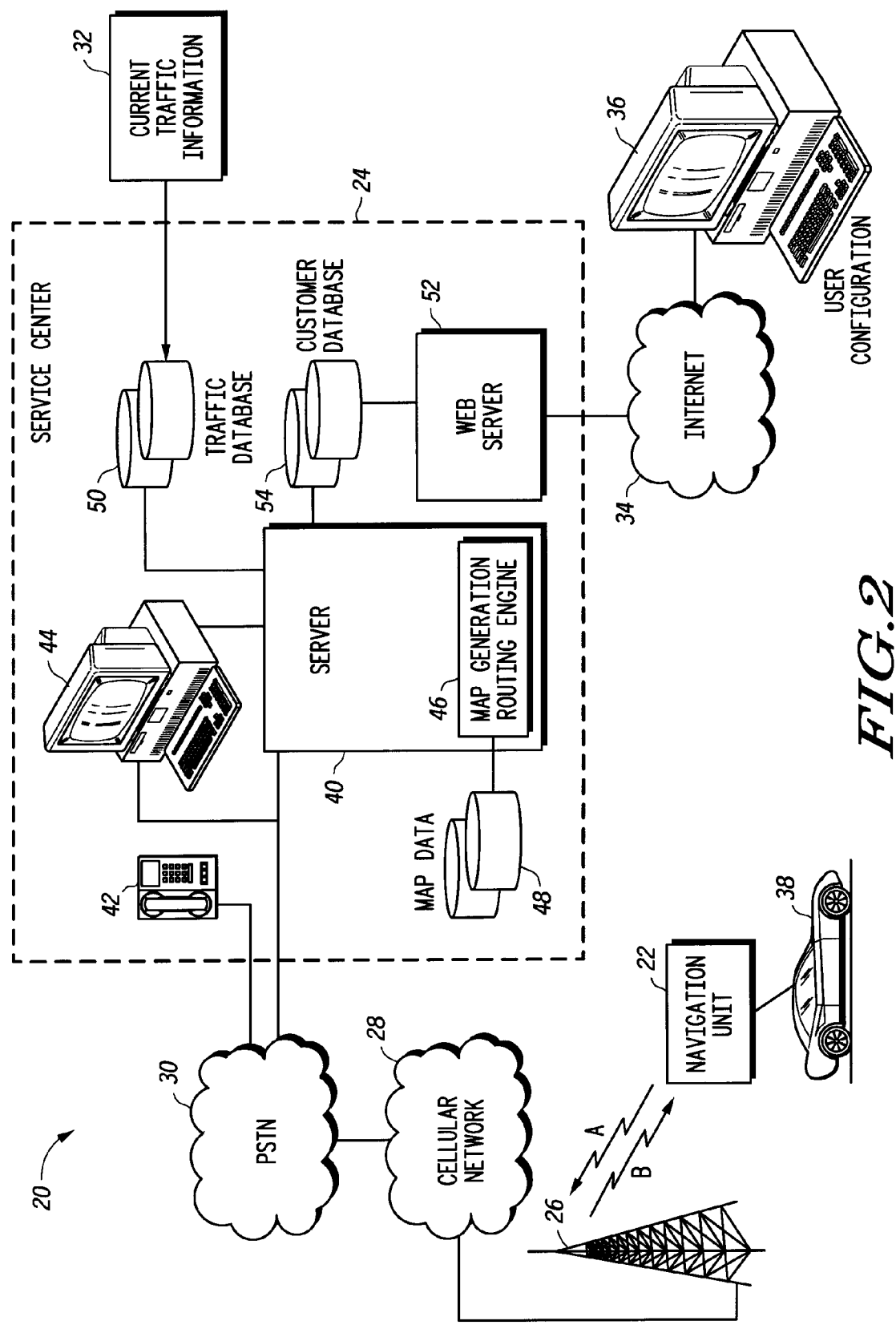
FIG. 2 is a block diagram of the navigation system in FIG. 1 showing further details of one embodiment of a service center of the system.

The service center 24 of the navigation system 20 will now be described in more detail. Referring now to FIG. 2, at the heart of the service center 24 is a server 40. The service center 24, through server 40, performs several functions including receiving the starting point and destination point, selecting a route based on the received locations, determining certain points along the selected route, and transmitting data associated with the determined points to the navigation unit 22.

As stated, one function of the service center 24 is to receive the starting point and destination point transmitted by the navigation unit 22. Accordingly, in one embodiment, the service center 24 may further include at least one telephone 42 and at least one computer terminal 44. In this embodiment, an operator at the service center 24 may use the telephone 42 to receive voice communications from the user of the navigation unit 22. The operator may be a live person or an automated voice recognition system. During the voice communication, the user of the navigation unit 22 can provide the operator with the starting point and destination point. The operator may then enter, or otherwise input, the starting point and destination point into the computer terminal 46. In this embodiment, the server 40 receives the starting point and destination point from the computer terminal 46. Alternatively, in another embodiment, the navigation unit 22 may be configured to directly transmit the starting point and/or destination point to the server 40 via a digital transmission. For example, a GPS module may determine the starting point of the navigation unit 22 and a wireless communication device in the navigation unit 22 can digitally transmit that information to the server 40 using a cellular communication. The navigation unit 22 could also be configured to allow the user to type or otherwise manually enter the destination point. The entered destination point could be encoded and transmitted to the server 40 via a digital transmission.

Another function of the service center 24 is to select a route based on the received starting and destination points. The server 40 in the service center 24 uses a map generation routing engine 46 to select a route. The map generation routing engine 46 may be a separate component or integral to the server 40. The server 40 uses the map generation routing engine 46 to select a route based on the received starting and destination points. Connected to the map generation routing engine 46 is stored digital map data 48 that is used to select a route from the starting point to the destination point. Map generation routing engines and digital map data are known in the art.

The service center 24 may also be configured to receive current traffic information 32. In one embodiment, the server 40 is connected to a traffic database 50 that stores and updates information received from a service provider or other current traffic source. Through this connection, the server 40 can access the traffic database during route selection. The source of the current traffic information 32 is preferably from a service provider that can provide current traffic information in a digital format. Known service providers can provide digital information obtained from sensors deployed on the roadways that detect traffic flows. Sensors to detect traffic speed, time and congestion have been known since before 1990. Accordingly, the actual construction and operation of such sensors to detect current traffic information 32 is implementation specific. The present invention may use current traffic information 32 obtained from any type of these well-known sensors.

Route selection may also consider previously selected preferences by the user of the navigation unit 22. In one embodiment, the service center 24 further includes a web server 52 and a customer database 54. The web server 52 is connected to the Internet 34 to allow the user to access the service center 24 via a remote device 36. For example, from remote device 36, the user could require that route selection include or not include the consideration of current traffic information. Information received through web server 52 is stored and updated in the customer database 54. The server 40 may be connected to the customer database 54 to allow the server 40 to access the customer database during route selection.

Figure 3:
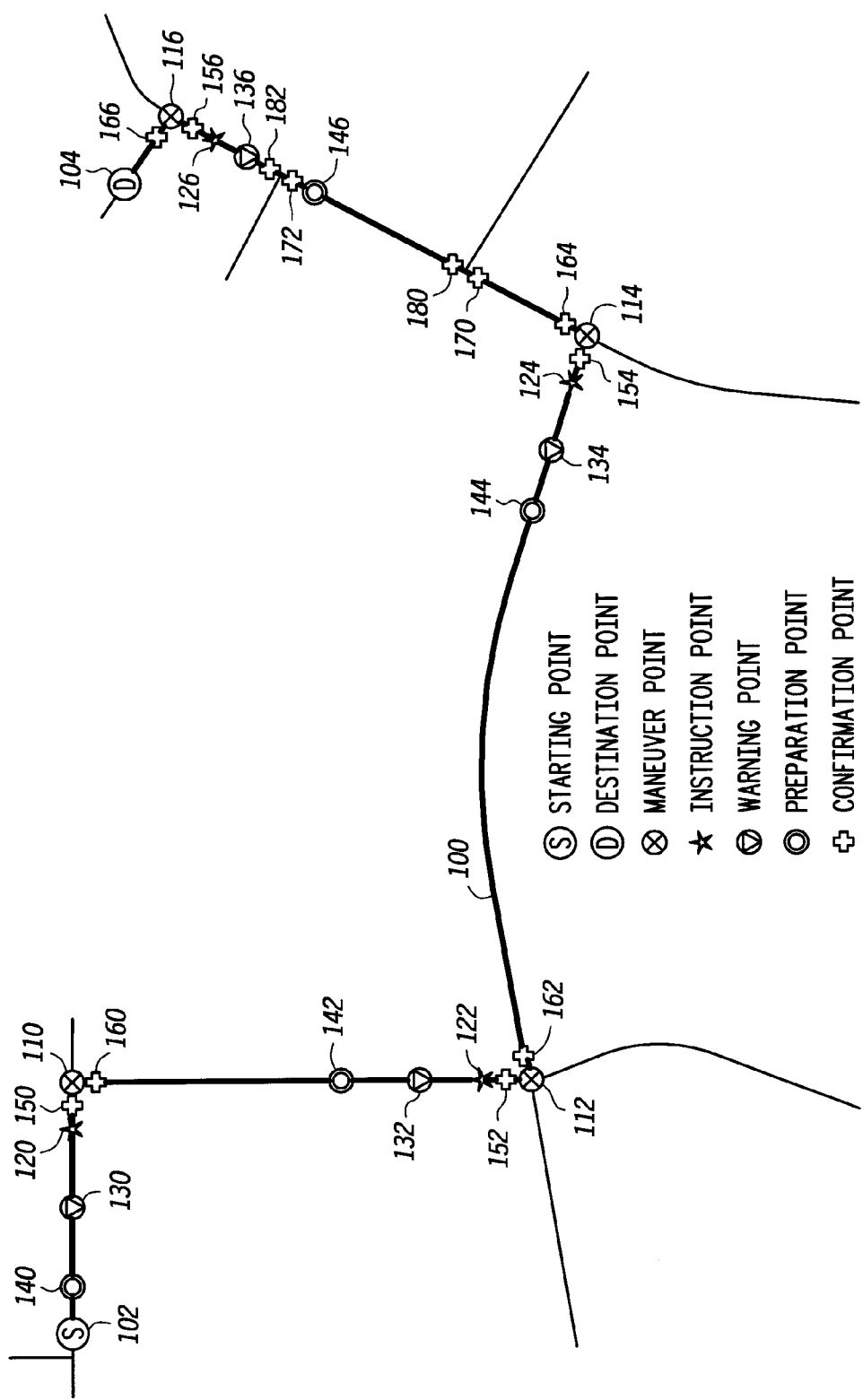
FIG. 3 is a map illustrating the selection by the service center of certain points along a route used in the navigation system of the present invention.

A further function of the service center 24 is to determine certain points after the route is selected. The details of these determined points by the server 40 are further explained with reference to FIG. 3. FIG. 3 graphically illustrates a map having a dark line that represents a route 100 selected as described above. The selected route 100 extends from a starting point 102 to a destination point 104. As will be explained in more detail below, the server 40 determines various sets of points along the route 100. As those skilled in the art will appreciate, each point along the route represents a specific purpose along the route.

In one embodiment, the server 40 determines a set of maneuver points 110, 112, 114, 116 along the selected route 100. The maneuver points 110, 112, 114, 116 represent points along the selected route 100 where a maneuver must be taken by the user of the navigation unit 22 to properly progress along to reach the destination point 104. In one embodiment, the maneuver points 110, 112, 114, 116 are simply used to determine other points along the selected route 100 and not themselves downloaded to the navigation unit 22. However, depending on the specific implementation, the maneuver points 110, 112, 114, 116 could be downloaded to the navigation unit 22. Moreover, in the preferred embodiment, the route topology or the route 100 itself is not downloaded to the navigation unit 22.

The server 40 may also determine a set of instruction points 120, 122, 124, 126. Each instruction point 120, 122, 124, 126 is positioned prior to each maneuver point 110, 112, 114, 116, respectively. These instruction points 120, 122, 124, 126 are intended to provide final instructions to the user of the navigation unit 22 to perform a maneuver. In determining each point, the server 40 may generate data associated with each point such as a set of coordinates and a message that can be outputted to the user. In one embodiment, token numbers may be used to form the message associated with a point. The token numbers are representative of a string of voice or text words and phrases to be outputted to the user of the navigation unit 22 when the user of the navigation unit 22 reaches the set of coordinates of the instruction point 120, 122, 124, 126. For example, when the user of the navigation unit 22 comes within a predetermined radius of the coordinates of instruction point 120, the user may be provided with a voice or text message such as "Please turn right." Instruction points 122, 124, 126 may provide the user of the navigation unit 22 with a voice or text message such as "Please turn left." Additionally, the server 40 may generate data associated with each point that includes the type of point (i.e. instruction point), the type of maneuver, the name of the street to turn on to, a graphic representation of the maneuver, and the like.

In cases where multiple maneuvers are very close together, the spoken instructions may become more complex. For example, an instruction point (not shown) may provide the following instructional message to the user of the navigation unit 22: "Please turn right and then left." This may be important when the distance between maneuver points is limited and the messages of various points can be combined. In this way, the user of the navigation unit 22 can follow the instructions for two or more maneuvers at one time. Moreover, a maneuver for more complex operations such as a roundabout may have a message such as "Please take the third exit of the roundabout." A maneuver that takes a user off an expressway may have a message such as "Please exit the expressway."

The server 40 may also determine a set of warning points 130, 132, 134, 136. Each warning point 130, 132, 134, 136 is positioned prior to each maneuver point 110, 112, 114, 116, respectively. These warning points 130, 132, 134, 136 are intended to provide a warning to the user of the navigation unit 22 that a maneuver is coming up. The distance between the warning points 130, 132, 134, 136 and the maneuver points 110, 112, 114, 116 is greater than the distance between the instruction points 120, 122, 124, 126 and the maneuver points 110, 112, 114, 116.

In determining each point, the server 40 may generate data associated with each warning point 130, 132, 134, 136 such as a set of coordinates and a message to be outputted to the user. In one embodiment, token numbers are used to represent a string of voice or text words and phrases that form a message to be outputted to the user of the navigation unit 22 when the user of the navigation unit 22 reaches the set of coordinates of the warning points 130, 132, 134, 136. For example, warning point 130 may provide the user of the navigation unit 22 with a voice or text message such as "In (250 meters) turn right." Warning points 132, 134, 136 may provide the user of the navigation unit 22 with a voice or text message such as "In (250 meters) turn left." Additionally, the server 40 may generate data associated with each point that includes the type of point (i.e. warning point).

It is preferred that a distinction be made between the various speed classes of roadways so that the various warning points 130, 132, 134, 136 can be placed at appropriate distances to give the user of the navigation unit 22 enough time to react to the voice or text messages. For example, a warning point on a road with a high-speed class would be positioned farther from the maneuver point than a warning point on a road with a low speed class. Accordingly, the service center 24 may further include as part of the stored digital map data 48 information on the various speed classes of the roadways. The server 40 along with the map generation routing engine 46 can then use the various speed classes to appropriate position of the warning points 130, 132, 134, 136. As those skilled in the art will appreciate, having the benefit of this disclosure, the selection of distances between the warning points 130, 132, 134, 136 and associated maneuver points 10, 112, 114, 116 as well as the outputted voice or text messages are implementation specific. Speed class also can affect the position or location of instruction points.

The server 40 may further determine a set of preparation points 140, 142, 144, 146. Each preparation point 140, 142, 144, 146 is positioned prior to each maneuver point 110, 112, 114, 116, respectively. These preparation points 140, 142, 144, 146 are intended to prepare the user of the navigation unit 22 that a maneuver is coming up.

Similar to the other points, the server 40 may generate data associated with each preparation point 140, 142, 144, 146 such as a set of coordinates and a message to be outputted to the user. In one embodiment, the token numbers may be used that represent a string of voice or text words and phrases that form a message to be outputted to the user of the navigation unit 22 when the user of the navigation unit 22 reaches the set of coordinates of the preparation points 140, 142, 144, 146. For example, preparation point 140 may provide the user of the navigation unit 22 with a voice or text message such as "Prepare to turn right in (500 meters)." Preparation points 142, 144, 146 may provide the user of the navigation unit 22 with a voice or text message such as "Prepare to turn left in (500 meters)." Additionally, the server 40 may generate data associated with each point that includes the type of point (i.e. preparation point), the type of maneuver, the name of the street to turn on to, a graphic representation of the maneuver, and the like.

It is preferred that a distinction is also made between the various speed classes of roadways so that the various preparation points 140, 142, 144, 146 can be placed at appropriate distances to give the user of the navigation unit 22 enough preparation to react to the voice or text messages. For example, a preparation point on a road with a high-speed class would be positioned farther from the maneuver point than a preparation point on a road with a low speed class. Accordingly, the service center 24 may further include as part of the stored digital map data 48 information on the various speed classes of the roadways. The server 40 along with the map generation routing engine 46 can then use the various speed classes to determine the appropriate position or location of the preparation points 140, 142, 144, 146. As those skilled in the art will appreciate, having the benefit of this disclosure, the selection of distances between the preparation points 140, 142, 144, 146 and associated maneuver points 110, 112, 114, 116 as well as the outputted voice or text messages are implementation specific.

The server 40 may further determine a set of confirmation points. In one embodiment, separate sets of confirmation points are placed before and after every maneuver point. Each set of confirmation points at a maneuver point has a first confirmation point 150, 152, 154, 156 and a second confirmation point 160, 162, 164, 166. The first confirmation points 150, 152, 154, 156 are positioned just prior to maneuver points 110, 112, 114, 116, respectively. The second confirmation points 160, 162, 164, 166 are positioned just after maneuver points 110, 112, 114, 116, respectively. These confirmation points are positioned to confirm that the user of the navigation unit 22 is properly traveling to its destination point.

As will be explained in more detail below, after reaching a first confirmation point 150, 152, 154, 156, the navigation unit 22 then monitors the current location of the navigation unit 22 for a predetermined time period or predetermined measured distance traveled until the navigation unit 22 reaches the associated second confirmation point 160, 162, 164, 166. By passing through a first confirmation point 150, 152, 154, 156 and then passing through an associated second confirmation point 160, 162, 164, 166, respectively, the navigation unit 22 knows that the user is still traversing on the selected route. However, when the navigation unit 22 passes through a first confirmation point 150, 152, 154, 156 but fails to pass through an associated second confirmation point 160, 162, 164, 166, respectively, within a predetermined time period or predetermined measured distance traveled, the navigation unit 22 knows that the user has gone off course. If this occurs, the navigation unit 22 may then provide a warning to the user.

The server 40 may generate data associated with each confirmation point such as the type of point (i.e. first or second confirmation point) and a set of coordinates that position the confirmation points along the selected route. In one embodiment, certain confirmation points may further include token numbers that represent a string of voice or text words and phrases that form a message to be outputted to the user of the navigation unit 22. The message may provide a confirmation or reassurance to the user of the navigation unit 22 that the user is traversing properly along the selected route 100. For example, in addition to a set of coordinates, the second confirmation point 160 may include token numbers that represent a string of voice or text words and phrases to be outputted to the user of the navigation unit 22 when the user of the navigation unit 22 reaches the second confirmation point 160. A suitable voice or text message may include "Continue to follow the road for (1000 meters)."

To further minimize the amount of data transmitted to the navigation unit 22, in an alternative embodiment, the first confirmation points 150, 152, 154, 156 may be substituted with the instruction points 120, 122, 124, 126. In other words, when the navigation unit 22 passes through an instruction point 120, 122, 124, 126, the navigation unit 22 then monitors the current location of the navigation unit 22 for a predetermined time period or predetermined measured distance traveled until the navigation unit 22 reaches an associated confirmation point 160, 162, 164, 166. By passing through an instruction point 120, 122, 124, 126 and then through an associated confirmation point 160, 162, 164, 166, respectively, the navigation unit 22 knows that the user is still traversing on the selected route. However, in this alternative embodiment, when the navigation unit 22 passes through an instruction point 120, 122, 124, 126, but fails to pass through an associated confirmation point 160, 162, 164, 166, respectively, within a predetermined time period or predetermined measured distance traveled, the navigation unit 22 knows that the user has gone off course. If this occurs, the navigation unit 22 may then provide a warning to the user.

In addition to confirmation points associated with maneuver points, a separate set of confirmation points may also be placed before and after every intersection where there is an opportunity for the user of the navigation unit 22 to leave the selected route 100. For example, FIG. 3 shows separate sets of confirmation points 170, 172, 180, 182 at every intersection along the route where there is an opportunity to leave the selected route 100 (apart from the confirmation points associated with particular maneuver points). Each set of confirmation points has a first confirmation point 170, 172 and a second confirmation point 180, 182.

Again, as will be explained in more detail below, after reaching a first confirmation point 170, 172, the navigation unit 22 then monitors the current location of the navigation unit 22 for a predetermined time period or predetermined measured distance traveled until the navigation unit 22 reaches the associated second confirmation point 180, 182. By passing through a first confirmation point 170, 172 and then passing through an associated second confirmation point 180, 182, respectively, the navigation unit 22 knows that the user is still traversing to its destination point. However, when the navigation unit 22 passes through a first confirmation point 170, 172 but fails to pass through an associated second confirmation point 180, 182, respectively, within a predetermined time period or predetermined measured distance traveled, the navigation unit 22 knows that the user has gone off course. If this occurs, the navigation unit 22 may then provide a warning to the user.

For a destination point, the server 40 may generate data representative of the destination point 104 such as the type of point (i.e. destination point) and a set of coordinates that will inform the navigation unit 22 that it has reached its destination.

In addition, the server 40 may generate and attach certain token numbers. The token numbers would be representative of a string of voice or text words and phrases to be outputted to the user of the navigation unit 22 when the user of the navigation unit 22 reaches the destination point 104. For example, when the user of the navigation unit 22 reaches the destination point 104 a voice or text message may state: "You are arriving at your destination." Alternatively, the navigation unit 22 may be configured to automatically play a predetermined termination message when the user reaches the destination point.

A further function of the service center 24 is to transmit or send the data associated with certain determined points to the navigation unit 22. In one embodiment, the transmitted data for each point may include items such as the type of point, a set of coordinates, and any associated messages (if needed). The associated messages may be represented in terms of token numbers as further described below. The associated messages may also be included in an attached voice file, such as an MP3 file, although the use of token numbers is preferred because it reduces the amount of data transmitted to the navigation unit 22. Some navigation units 22 may also be configured to render speech instructions using text-to-speech technology. In this case, it may be appropriate to just send the actual text to be spoken along with the coordinates of a particular point. This would allow any words to be spoken from the recited text instead of prerecorded messages. Other types of data that may be associated with a particular point may include a road heading, a sequence number, a street name, or graphic representation of the maneuver. The server 40 may encode the information into a digital message and transmit or send the data to the navigation unit 22 by a wireless communication.

Figure 4A:
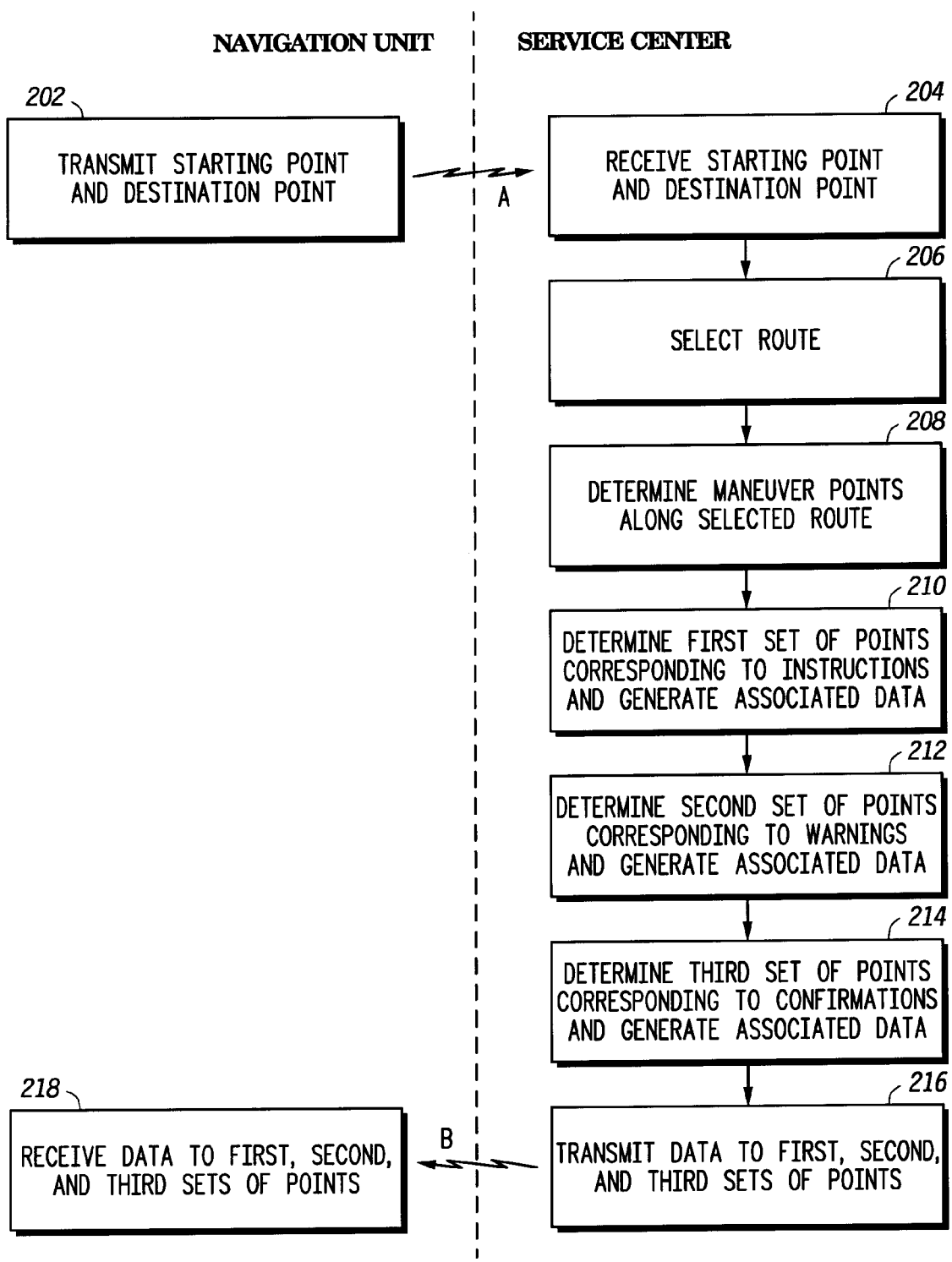
FIG. 4A is a flow diagram illustrating one embodiment of operations between the navigation unit and the service center in the navigation system of the present invention.

FIG. 4A illustrates a summary of the operation and interaction between the navigation unit 22 and the service center 24 in one embodiment of present invention. In block 202, the navigation unit 22 transmits a starting point and a destination point to the service center 24. This has been previously described as being either a voice call or a wireless data transmission. In block 204, the service center 24 receives the starting point and the destination point from the navigation unit 22. This has been previously described as being received by an operator and inputted to the server 40 or directed inputted to the server 40 by a digital transmission. After the service center 24 receives the starting point and the destination point, in block 206, the service center 24 may select a route 100. In block 208, the service center 24 determines a set of maneuver points (such as points 110, 112, 114, 116) along the selected route 100. Those of ordinary skill in the art having the benefit of this disclosure will appreciate that selecting a route 100 (in block 206) could be merged or done in conjunction with the determination of the maneuver points.

In block 210, the service center 24 determines a first set of points that correspond to instructions (such as instruction points 120, 122, 124, 126). In determining a first set of points corresponding to instructions, the service center 24 may generate data associated with the first set of points such as a set of coordinates and voice or text messages represented by token numbers. The service center 24 may also generate additional data associated with the first set of points such as the type of point (i.e. instruction point), the sequence number, the road heading and/or the name of the street.

In block 212, the service center 24 determines a second set of points that correspond to warnings (such as warning points 130, 132, 134, 136). In determining a second set of points corresponding to warnings, the service center 24 may generate data associated with the second set of points such as a set of coordinates and voice or text messages represented by token numbers. The service center 24 may also generate additional data associated with the second set of points such as the type of point (i.e. warning point), the sequence number, the road heading and/or the name of the street.

In block 214, the service center 24 determines a third set of points that correspond to confirmations (such as confirmation points 150, 160, 152, 162, 154, 164, 156, 166). In determining a third set of points corresponding to confirmations, the service center 24 may generate data associated with the third set of points such as a set of coordinates and the type of point (such as first or second confirmation point). The service center 24 may also generate additional data associated with the third set of points such as any token numbers for voice or text messages, the sequence number, the road heading, the predetermined time period, and/or the predetermined measured distance traveled.

Other points may be determined by the service center 24. For example, in one embodiment, the service center 24 may further determine a fourth set of points that correspond to preparations (such as preparation points 140, 142, 144, 146). In determining a fourth set of points corresponding to preparations, the service center 24 may generate data associated with the fourth set of points such as a set of coordinates and voice or text messages. The service center 24 may also generate additional data associated with the fourth set of points such as the type of point (i.e. preparation point), the sequence number, the road heading and/or the name of the street.

After certain points are determined and data associated with each point are generated; in block 216, the service center 24 transmits or sends the data associated with certain points to the navigation unit 22. This may be done by digitally encoding the data and transmitting the data to the navigation unit 22 by a wireless communication. As explained above, the type of data transmitted for each point may include the type of point (i.e. instruction point, warning point, first confirmation point, second confirmation point), the coordinates of the point, and any associated voice commands or text messages. In block 218, the navigation unit 22 receives the data for the points transmitted or sent by the service center 24.

Figure 4B:
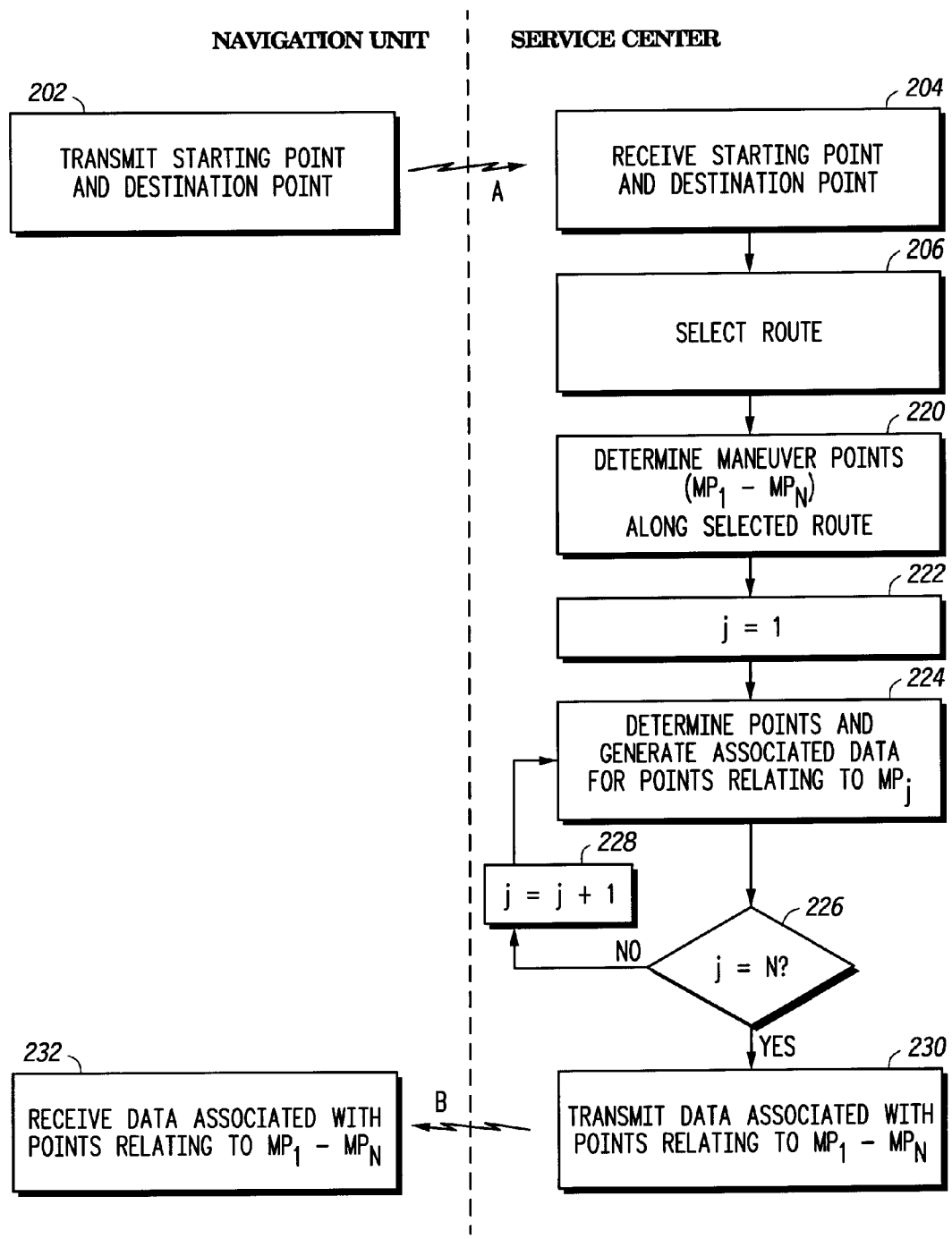
FIG. 4B is a flow diagram illustrating another embodiment of operations between the navigation unit and the service center in the navigation system of the present invention.

FIG. 4B illustrates a summary of another embodiment of the operation and interaction between the navigation unit 22 and the service center 24. It is similar to the operation in FIG. 4A in that the navigation unit 22 transmits a starting point and a destination point (block 202), the service center 24 receives the starting point and the destination point (block 204), and the service center 24 selects a route based on the starting point and the destination point. In this case, however, the various points related with a single maneuver are generated all at the same time. Then the software proceeds to the next maneuver point in the route sequence.

For example, in FIG. 4B, in block 220, the service center 24 determines the maneuver points ($MP_1$–$MP_N$) along a selected route and then, in block 222, initializes a variable (j) to a first number (j=1). In block 224, the service center 24 determines the points (such as instruction points, warning points, confirmation points, preparation points, etc.) relating to a specific maneuver point (j). The service center 24 will also generate the associated data for each point (such as the coordinates of the point, the type of point, the sequence number of the point, the road heading, the street name, and/or graphic representation of the maneuver).

After determining the associated points and generating associated data for the points relating to the first maneuver point (j=1), the process proceeds to decision block 226. At decision block 226, a decision is made whether the maneuver point is the last maneuver point. If the process is not at the last maneuver point, the process proceeds to block 228 and back to block 224 where the next maneuver point is dealt with (j=j+1). For the next maneuver point, the process determines the points relating to the next maneuver point and generates the associated data for each point. This process continues until the last maneuver point has been dealt with (j=N). At this point, the process proceeds to block 230.

At block 230, the service center 24 transmits or sends the data associated with the points relating to maneuver points ($MP_1$–$MP_N$). This may be done by digitally encoding the data and transmitting the data to the navigation device 22 by a wireless communication. In block 232, the navigation device receives the data for the points transmitted or sent by the service center 24.

The placement of certain points in the present invention is designed to make the navigation unit 22 as simple as possible while still providing a satisfying and accurate route guidance experience to the user. Those of ordinary skill in the art having the benefit of this disclosure will appreciate that when there is a long segment along the selected route 100 that has no intersections, there is no need to place additional points to represent the shape or topology of the selected route. The determination and selection of points as described herein provides the distinct advantage of minimizing the amount of downloaded data from the service center 24 yet provides a meaningful navigation tool to the user of the navigation unit 22.

Navigation Unit 22

Figure 5:
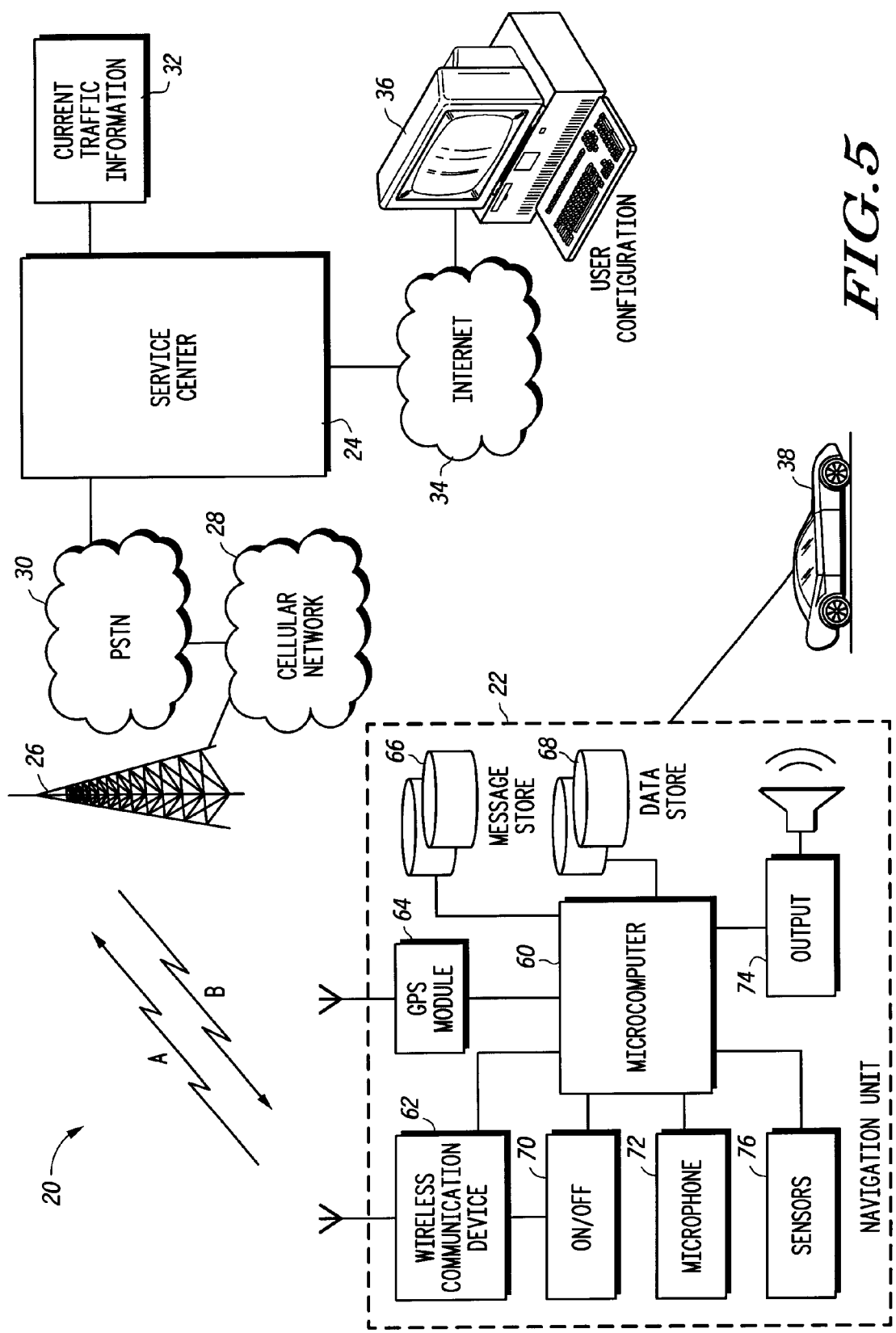
FIG. 5 is a block diagram of the navigation system in FIG. 1 showing further details of one embodiment of a navigation unit of the system.

The navigation unit 22 will now be described in more detail. Referring to FIG. 5, in one embodiment, the navigation unit 22 may be positioned in a vehicle 38 although the navigation unit described herein could be used in other ways such as in personal navigation systems in phones or PDAs. At the heart of the navigation unit 22 is a microcomputer 60. The navigation unit 22 may further include a wireless communication device 62, a GPS module 64, a memory 66 to store possible outputted messages (i.e. speech and/or text words and phrases), a memory 68 to store data on points downloaded from the service center 24, an on/off button 70 to activate/deactivate the system, and a microphone 72 and output 74 for hands-free operation.

In one embodiment, the wireless communication device 62 includes a transmitter to transmit cellular wireless communications such as AMPS, CDMA, GSM or TDMA. The wireless communication device 62 may also be configured to transmit by other wireless communications such as a satellite communication. As explained above, the transmitter is used to transmit to the service center 24 the starting point and destination point of the user. The starting point and destination point may be transmitted by the user to the service center 24 through a voice call or may be transmitted separately or jointly during a digital transmission.

If a voice call is used to communicate either the starting or destination point, in one embodiment, the navigation unit 22 may have a microphone to provide hands-free operation for the user. To initiate the voice call, the user activates the on/off button 70 and the navigation unit 22 dials a predetermined number to reach the service center 24. When a communication link is established with the service center 24, the user of the navigation unit 22 can provide at least the desired destination point by speaking into the microphone 72. The user can also provide the starting point during the voice communication or the starting point can be transmitted separately after the GPS module 64 determines a current location.

The wireless communication device 62 includes a receiver to receive and decode the digital data associated with the points sent or otherwise transmitted by the service center 24. As described above, the service center 24 determines a variety of points based on a starting point and destination point. The service center 24 then generates data associated with certain points and transmits that data to the navigation unit 22. The data associated with each point may include the type of point (i.e. instruction point, warning point, first confirmation point, second confirmation point, destination point), the coordinates for the point, the road heading for the point, a sequence number for the point, the street name, and any associated voice commands or text messages such as token numbers. The navigation unit 22 receives the transmitted data for each point through wireless communication device 62. The receiver may be configured to receive digital cellular communications such as CDMA, GSM or TDMA. The receiver may also be configured to receive other types of wireless communications such as those transmitted by satellites.

The received data associated with each point is stored in a memory 68. As will be explained further below, the microcomputer 60 may then use the received and stored data in memory 68 to provide a meaningful navigation experience to the user of the navigation unit 22. Generally, the microcomputer 60 compares the current location of the navigation unit 22 (obtained from the GPS module 64) with the coordinates associated with certain downloaded points. When the current location of the navigation unit 22 is within a predetermined radius of the coordinates of a point, the microcomputer 60 may retrieve any associated messages with the point, if they exist. In one embodiment, the message data associated with each point may include token numbers. The token numbers would represent a string of pre-recorded voice or text words and phrases to be outputted to the user of the navigation unit 22. Common street names may also be incorporated into the spoken or textual message. The combined string of pre-recorded voice or text words or phrases form a message that may be provided to an output 74 of the navigation unit 22. The output 74 may be a speaker for playing voice messages and/or a screen for displaying text messages and/or graphics.

The navigation unit 22 may further include sensors 76 or inputs from various sensors already existing on the vehicle 38. The types of sensors 76 that may be applicable for the navigation unit 22 are a speed sensor and a direction or heading sensor. The information from vehicle sensors may be used in combination with the GPS module to confirm that the navigation unit 22 is properly traversing to the destination point.

The processing of received data associated with certain points by the microcomputer 60 will now be explained in more detail. There are a variety of ways that the navigation unit 22 can store the data received from the service center 24 and process that data as a navigation tool. Two suitable techniques will now be described although one of ordinary skill in the art having the benefit of this disclosure will realize that other ways may be used.

The microcomputer 60 may have a processor that implements software stored in memory. In one embodiment, the data associated with each point may be sequentially stored in memory 68 as shown in FIG. 6. In this context, the term "sequential" means that the points are stored in the order that the vehicle would travel to get to a particular destination point. FIG. 6 shows a series of records, each record having a key field or sequence number 302 and a series of data fields 304, 306, 308 that are capable of storing data associated with each point received from the service center 24. The key fields or sequence numbers 302 may be automatically generated based on the size of the message or flags in the message transmitted from the service center 24. The key fields or sequence number 302 may also be transmitted from the service center 24 to the navigation unit 22 as part of the data generated for each point.

For purposes of illustration, in this embodiment, each record in FIG. 6 corresponds to data associated with each point discussed above in relation to FIG. 3. For example, the first record (i=1) is capable of storing data associated with the first point along the route generated by the service center 24. In relation to FIG. 3, the first point along the route 100 is preparation point 140. As explained above, for preparation point 140, the service center 24 generates data associated with the point such as a set of coordinates of the point and data for a voice or text message. Here, token numbers are used to represent a string of voice or text words and phrases to be outputted to the user of the navigation unit 22. Additionally, although not required in all applications, the service center 24 may also generate data associated with point 140 that includes the type of point (i.e. preparation point—PP). Accordingly, a field within the record may then be reserved for the storage of the type of point.

By further way of example, the second record (i=2) is capable of storing data associated with the second point along the route generated by the service center 24. In relation to FIG. 3, the second point along route 100 is warning point 130. As explained above, for warning point 130, the service center 24 generates data associated with the point such as a set of coordinates of the point and data for a voice or text message (such as token numbers). The token numbers here represent a string of voice or text words and phrases to be outputted to the user of the navigation unit 22. Similarly, although not required in all applications, the service center 24 may also generate data associated with point 130 that includes the type of point (i.e. warning point—WP). Accordingly, a field within the record may then be reserved for the storage of the type of point.

Other records in FIG. 6 may be associated with other points received from the service center 24 such as instruction points (IP), first confirmation points (C1), second confirmation points (C2), and a destination point (DP). In the context of FIG. 3, the third record (i=3) in FIG. 6 is capable of storing data associated with instruction point 120. The fourth record (i=4) is capable of storing data associated with first confirmation point 150. The fifth record (i=5) is capable of storing data associated with second confirmation point 160. The sixth record (i=6) is capable of storing data associated with preparation point 142. The seventh record (i=7) is capable of storing data associated with warning point 132. The eighth record (i=8) is capable of storing data associated with instruction point 122. The ninth record (i=9) is capable of storing data associated with first confirmation point 152. The tenth record (i=10) is capable of storing data associated with second confirmation point 162. The eleventh record (i=11) is capable of storing data associated with preparation point 144. The twelfth record (i=12) is capable of storing data associated with warning point 134. The records continue for each point and ends with the destination point 104.

For each record, in one embodiment, a first field 304 may include the type of point (i.e. preparation point—PP, warning point—WP, instruction point—IP, first confirmation point—C1, second confirmation point—C2, destination point—DP). A second field 306 may include the coordinates of the point. A third field 308 may include any associated token numbers for the point. The fields in FIG. 6 are merely one embodiment of how data may be stored in the navigation unit 22. One of ordinary skill in the art having the benefit of this disclosure will realize that other storage means are suitable. Moreover, every field for each record does not have to be populated. For example, as will be seen in relation to the process described in FIG. 8, the identification of the type of point may not be necessary for all points. In other words, the knowledge of the identification of a specific type of point is implementation specific.

As explained above, when token numbers are used, the token numbers associated with each point represent a string of pre-recorded voice or text words and phrases to be outputted to the user of the navigation unit 22. Common street names may also be incorporated into the spoken or textual message. The combined string of pre-recorded voice or text words and phrases form a message provided to the output 74 of the navigation unit 22. These pre-recorded voice or text words and phrases may be stored and accessed from memory 66. Alternatively, as mentioned above, the navigation unit 22 may be able to render speech instructions using text-to-speech technology. In this case, it may be appropriate to send the actual text to be spoken along with a particular point. This allows for any words to be spoken or generated from the text and avoids pre-recorded words or phrases.

FIG. 7 illustrates one embodiment of how certain words and phrases may be stored and accessed in memory 66. In FIG. 7, certain words and phrases 312 are organized and accessible according to token numbers 310. For example, the token numbers associated with the first point (i=1) in FIG. 6 are 5–2–4–9. When the user reaches a predetermined radius of the coordinates for the first point, the navigation unit 22 would output the corresponding string of words and phrases 312. In this case, the corresponding string of words and phrases result in the following message: "Prepare to turn right in 500 meters". The stated distance may vary based on the speed class of the road.

Figure 8:
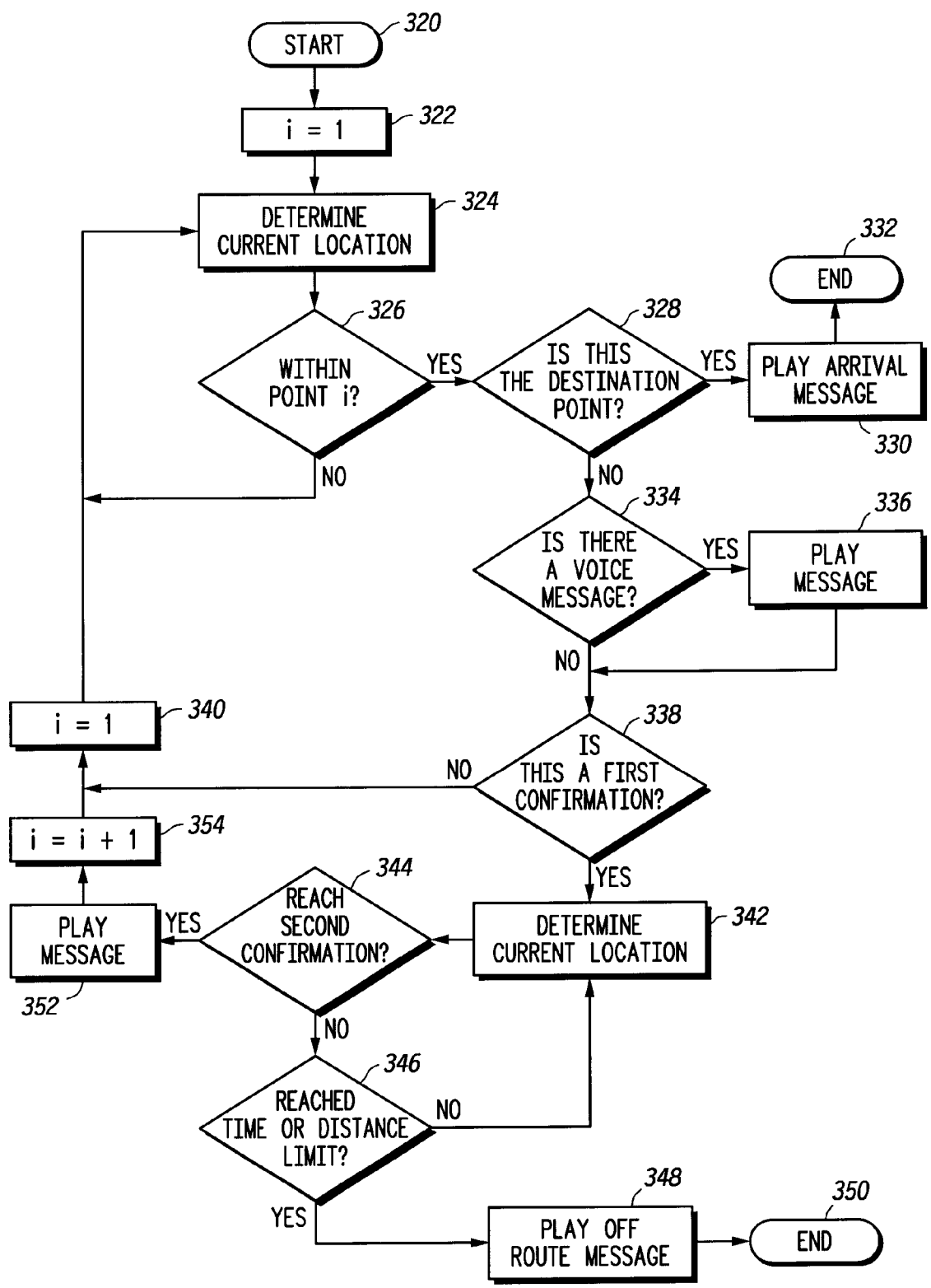
FIG. 8 is a flow diagram illustrating one embodiment of a method performed in the navigation unit to process the points received from the service center.

FIG. 8 illustrates one embodiment for a method in the navigation unit 22 for processing the data associated with the points received from the service center 24. For this embodiment, the data associated with the points may be stored in memory 68 according to the embodiment shown in FIG. 6. The process starts at block 320. At block 322, a variable is initialized to i=1. This will allow the data associated with the first record (or point) in the memory 68 to be analyzed and processed. At block 324, the microcomputer 60 determines its current location by receiving the information from the GPS module 64. After determining the current location of the navigation unit 22, the microcomputer 60 reaches decision block 326. At decision block 326, the microcomputer 60 determines whether the current location of the navigation unit 22 is within a predetermined radius of the coordinates of the first point (i=1). The predetermined radius is implementation specific and will be based on any minor inaccuracies of the map information and GPS module 64 as well as the time period between sampling the current location. In this embodiment, if the current location of the navigation unit 22 does not fall within the predetermined radius of the coordinates of the first point (i=1), then a new current location is determined at block 324 and the new current location is compared to the predetermined radius of the coordinates of the first point (i=1). These steps are repeated (blocks 324 and 326) until the current location of the navigation unit 22 falls within the predetermined radius of the coordinates of the first point (i=1). When this happens, the process proceeds to decision block 328.

At decision block 328, a determination is made whether the point under consideration is a destination point. In the context of FIG. 6, this may be done by checking the type of point in field 304. If the point is a destination point, the process proceeds to block 330 where an arrival message may be outputted to the user and the process ends at block 332. If the point under consideration is not a destination point, the process proceeds to decision block 334.

At decision block 334, a determination is made whether the point under consideration has an associated voice message. In the context of FIG. 6, this may be done by checking whether any token numbers are associated with the point (or record) under consideration. If an outputted message is required, the process proceeds to block 336 where the message (whether voice and/or text) is provided to the user of the navigation unit 22. After playing the message, the process proceeds to decision block 338. If the point under consideration in decision block 334 does not have an associated message, the process also proceeds to decision block 338.

At decision block 338, a determination is made whether the point under consideration is a first confirmation point. In the context of FIG. 6, the determination may be done by checking the type of point in field 304. If the point is not a first confirmation point, then the process proceeds to block 340 where the variable (or sequence number) i is updated (i=i+1) so that the next point (or record) may be analyzed and processed. The process then proceeds to block 324 where the current location of the navigation unit 22 is determined and a decision is made whether the navigation unit 22 is within the next point. Referring back to decision block 338, if the point under consideration is a first confirmation point, then a process proceeds to block 342.

Block 342 is the beginning of the process described earlier where the navigation unit 22 monitors its current location for a predetermined time period or predetermined measured distance traveled until the navigation unit 22 reaches an associated second confirmation point. For example, in the context of the points described in relation to FIG. 3, by passing through a first confirmation point (such as point 150) and then passing through an associated second confirmation point (such as point 160), the navigation unit 22 knows that the user is still traversing properly to the destination point. However, if the navigation unit 22 passes through a first confirmation point (such as point 150) but fails to pass through an associated second confirmation point (such as point 160), within a predetermined time period or predetermined measured distance traveled, the navigation unit 22 knows that the user has gone off course. If this occurs, the navigation unit 22 may then provide a warning to the user. That process will now be explained in terms of the method illustrated in FIG. 8.

At block 342, the navigation unit 22 determines its current location by receiving that information from the GPS module 64. The process then proceeds to decision block 344. At decision block 344, a determination is made whether the current location of the navigation unit 22 reached the second confirmation point. In the context of FIG. 6, this can be done by comparing the coordinates in the next data field (i=i+1) with the current location of the navigation unit 22. Again, this comparison preferably includes a predetermined radius within the coordinates of the next data field to account for any minor inaccuracies of the GPS module 64 and the sampling rate of the current location. If the current location of the navigation unit 22 is not within the predetermined radius of the second confirmation point, the process proceeds to decision block 346.

At decision block 346, a determination is made whether the navigation unit 22 has reached a predetermined time limit or a predetermined measured distance traveled. This predetermined time or distance limit is set to a time period or distance traveled that the navigation unit 22 is reasonably expected to reach the second confirmation point after reaching the first confirmation point. The exact time period or distance traveled is implementation specific and may take into account variables such as the presence of street lights or speed classes of the roads. Alternatively, the time period or distance traveled may stop or otherwise be a function of a speed sensor 76 of the vehicle (see FIG. 5). If the predetermined time limit or a predetermined measured distance traveled for the navigation unit 22 to reach the second confirmation has not been reached yet, the process proceeds back to block 342 and decision block 344. This allows the navigation unit 22 to update its current location and determine whether it has now reached the second confirmation point. At decision block 346, if the predetermined time limit or a predetermined measured distance traveled for the navigation unit 22 has been reached, then the process proceeds to block 348. This tells the navigation unit 22 that the user is off course or has stopped unexpectedly. At block 348, the navigation unit 22 may present a warning or other off route message to the user. The process may then end at block 350 to allow the user to reinitiate a new request and receive new data from the service center 22.

Referring back to decision block 344, if the navigation unit 22 reaches the second confirmation point within the predetermined time limit, the process may then proceed to block 352 where a message is played to confirm that the user is proceeding correctly to the destination point. The process may then proceed to blocks 354 and 340 where the variable (or sequence number) i is updated so that it is advanced past the second confirmation point and to the next point after the second confirmation point. The process then proceeds back to block 324 for further analysis and processing of the next point after the second confirmation point.

In another embodiment, the data associated with each point may be non-sequentially stored in memory 68 as shown in FIG. 9. In this context, the term "non-sequential" means that the points are not stored in the order that the vehicle would travel to get to a particular destination point. For example, the points could be stored in records and fields according to the type of point as shown in FIG. 9. FIG. 9 shows a series of records, each record having a number of data fields 402, 404, 406 that are capable of storing data associated with each point received from the service center 24. For purposes of illustration, in this embodiment, each record in FIG. 9 corresponds to data associated with each point discussed above in relation to FIG. 3. This data is received from the service center 24. For example the first record (point type DP) is capable of storing data associated with the destination point 104 in FIG. 3. As explained above, for destination point 104, the service center 24 may generate data associated with the point such as the type of point and the set of coordinates for the point. Additionally, although not required in all applications, the service center 24 may also generate data associated with a voice or text message. Here, the voice or text message is represented in token numbers.

By further way of example, the next four records (point types IP) may be capable of storing data associated with the instruction points. In relation to FIG. 3, these points may refer to data associated with instruction points 120, 122, 124, 126. As explained above, for instruction points 120, 122, 124, 126, the service center 24 may generate data associated with the points such as a set of coordinates of each point and data referring to a voice or text message (such as token numbers). The service center 24 may also generate data associated with the instruction points that include the type of point (i.e. instruction point—IP).

Other records in FIG. 9 may be associated with other points received from the service center 24 such as warning points (WP), preparation points (PP), first confirmation points (C1), and second confirmation points (C2). For each record, in the embodiment for FIG. 9, a first field 402 may include the type of point (i.e. preparation point—PP, warning point—WP, instruction point—IP, first confirmation point—C1, second confirmation point—C2, destination point—DP). A second field 404 may include the coordinates of the point. A third field 406 may include any associated token numbers for the point. The token numbers may be used to form a message from a string of words and phrases stored in memory 66 and illustrated in one embodiment in FIG. 7.

Figure 10:
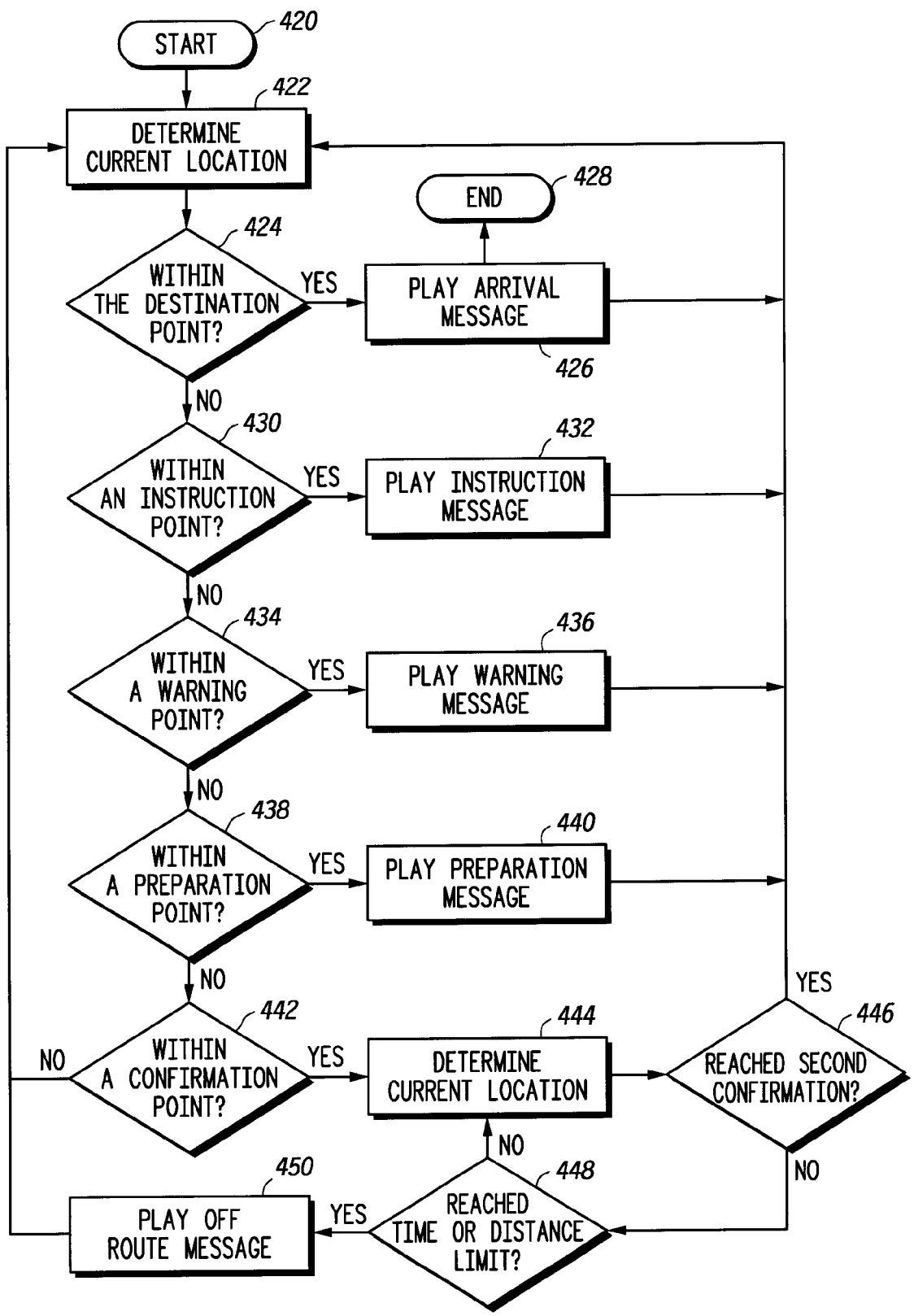
FIG. 10 is a flow diagram illustrating another embodiment of a method performed in the navigation unit to process the points received from the service center.

FIG. 10 illustrates another embodiment for a method in the navigation unit 22 for processing the data associated with the points received from the service center 24. For this embodiment, the data associated with the points may be stored in memory 68 according to the embodiment shown in FIG. 9. The process starts at block 420. At block 422, the microcomputer 60 determines its current location by receiving the information from the GPS module 64. After determining the current location of the navigation unit 22, the microcomputer 60 reaches decision block 424.

At decision block 424, the microcomputer 60 determines whether the current location of the navigation unit 22 is within a predetermined radius of coordinates of the destination point. The predetermined radius is implementation specific and will be based on any minor inaccuracies of the GPS module 64 as well as the time period between sampling the current location. In this embodiment, if the current location of the navigation unit 22 falls within the predetermined radius of coordinates of the destination point, then the process proceeds to block 426 where an arrival message may be outputted to the user and the process ends at block 428. If the current location of the navigation unit 22 is not within the predetermined radius of coordinates of the destination point, the process proceeds to decision block 430.

At decision block 430, a determination is made whether the current location of the navigation unit 22 is within a predetermined radius of coordinates of any instruction points. If the current location of the navigation unit 22 falls within the predetermined radius of coordinates of an instruction point, then the process proceeds to block 432 where any associated message for the instruction point is outputted to the user of the navigation unit 22. The process then proceeds to block 422 where a new current location is determined from the GPS module 64 and the entire process begins again. If the current location of the navigation unit 22 is not within the predetermined radius of coordinates of any instruction point, the process proceeds to decision block 434.

At decision block 434, a determination is made whether the current location of the navigation unit 22 is within a predetermined radius of coordinates of any warning point. If the current location of the navigation unit 22 falls within the predetermined radius of coordinates of a warning point, then the process proceeds to block 436 where any associated message for the warning point is outputted to the user of the navigation unit 22. The process then proceeds to block 422 where a new current location is determined from the GPS module 64 and the entire process begins again. If the current location of the navigation unit 22 is not within the predetermined radius of coordinates of any warning point, the process proceeds to decision block 438.

At decision block 438, a determination is made whether the current location of the navigation unit 22 is within a predetermined radius of coordinates of any preparation point. If the current location of the navigation unit 22 falls within the predetermined radius of coordinates of a preparation point, then the process proceeds to block 440 where any associated message for the preparation point is outputted to the user of the navigation unit 22. The process then proceeds to block 422 where a new current location is determined from the GPS module 64 and the entire process begins again. If the current location of the navigation unit 22 is not within the predetermined radius of the coordinates of any preparation point, the process proceeds to decision block 442.

At decision block 442, a determination is made whether the current location of the navigation unit 22 is within a predetermined radius of coordinates of any first confirmation point. If the current location of the navigation unit 22 is not within the predetermined radius of coordinates of any confirmation point, the process proceeds to block 422 where a new current location is determined from the GPS module 64 and the entire process begins again. If the current location of the navigation unit 22 is within the predetermined radius of the coordinates of any first confirmation point, begins a process described earlier where the navigation unit 22 monitors its current location for a predetermined time period or a predetermined measured distance traveled until the navigation unit 22 reaches an associated second confirmation point.

This confirmation process begins at block 444 where the microcomputer 60 of the navigation unit 22 determines its current location by receiving that information from the GPS module 64. The process then proceeds to decision block 446. At decision block 446, a determination is made whether the current location of the navigation unit 22 reaches an associated second confirmation point. This can be done in a number of ways. For example, the record of a first confirmation point could be associated with the record of a corresponding second confirmation point. In this way, the coordinates in the field of the associated record can be compared with the coordinates of the current location of the navigation unit 22. Again, this comparison preferably includes a predetermined radius within the coordinates of the associated record to account for any minor inaccuracies of the GPS module 64 and the sampling rate of the current location. If the current location of the navigation unit 22 is not within the predetermined radius of the associated second confirmation point, the process proceeds to decision block 448.

At decision block 448, a determination is made whether the navigation unit 22 has reached a predetermined time or distance limit. This predetermined time or distance limit is set to a time period or distance traveled that the navigation unit 22 is reasonably expected to reach the associated second confirmation point after reaching the first confirmation point. The exact time period or distance traveled is implementation specific and may take into account variables such as the presence of streetlights or speed classes of the roads. Alternatively, the time period or distanced traveled may be a function of a speed sensor 76 of the vehicle (see FIG. 5). If the predetermined time or distance limit for the navigation unit 22 to reach the second confirmation has not been reached yet, the process proceeds back to block 444 and decision block 446. This allows the navigation unit 22 to update its current location and determine whether it has now reached the second confirmation point. At decision block 448, if the predetermined time or distance limit for the navigation unit 22 has been reached, then the process proceeds to block 450. This tells the navigation unit 22 that the user is off course or has stopped unexpectedly. At block 450, the navigation unit 22 may present a warning or other off route message to the user. The process may then proceed back to block 422 to start the entire process over again.

Alternatively, after block 450, the process may be configured to end or automatically request a new route from the service center from the current position to the same destination.

Referring back to decision block 446, if the navigation unit 22 reaches the second confirmation point within the predetermined time limit, the process may then proceed to block 422 where the process in FIG. 10 may begin again. Alternatively, a message may be played to confirm to that the user is proceeding correctly to the destination point.

The benefit of the process described in FIG. 10 is that if the user leaves a selected route and then returns to pass another point, the route tracking and guidance can resume at the point where the route is entered. In this embodiment, it is preferred that the navigation unit 22 have a sensor 76 (or is capable of receiving data from a external sensor), such as a compass or gyroscope, for determining the direction of the vehicle. This may be important because without the direction, the person may be going the wrong way down the road and reaches a preparation, warning, or instruction point that informs the user to proceed ahead in the wrong direction. Additional data to be downloaded for each point may be needed in certain applications that would associate a road heading at a point.

What has been described is a server-based navigation system and method of transmitting navigation data to a navigation unit that reduces the complexity of the unit and minimizes the transmitted data. The above description of the present invention is intended to be exemplary only and is not intended to limit the scope of any patent issuing from this application. The present invention is intended to be limited only by the scope and spirit of the following claims.

What is claimed is:

1. A navigation system comprising:
   a navigation unit that is capable of transmitting a current location and a desired destination from a user; and
   a service center that is capable of receiving the current location and the desired destination and selecting a route between the current location and the desired destination, the service center being further capable of generating and transmitting data associated with a plurality of points on the selected route;
   wherein the data associated with the plurality of points is capable of being received by the navigation unit and used by the navigation unit to warn, instruct, and confirm that the user of the navigation unit is correctly traversing to the desired destination.

2. The navigation system in claim 1, wherein the plurality of points includes at least a set of warning points, a set of instruction points, and a set of confirmation points.

3. The navigation system in claim 2, wherein the data associated with each point includes a set of coordinates reflecting the location of the point.

4. The navigation system in claim 3, wherein the data associated with each warning point and instruction point further includes at least one token number that represents a message to be outputted to the user of the navigation unit when the navigation unit falls within a predetermined radius of the set of coordinates associated with the warning and instruction point.

5. The navigation system of claim 3, wherein the navigation unit has a memory that stores a plurality of pre-recorded messages, the pre-recorded messages capable of being accessed and outputted to the user of the navigation unit when the navigation unit falls within a predetermined radius of the set of coordinates for at least one of the warning and instruction points.

6. The navigation system in claim 2, wherein the set of confirmation points includes a first confirmation point and a second confirmation point, the first confirmation point positioned on the route before an upcoming maneuver on the route, the second confirmation point positioned on the route after the upcoming maneuver on the route.

7. The navigation system in claim 6, wherein the service center generates and transmits data to the navigation unit associated with the first confirmation point and the second confirmation point, the navigation unit having a microcomputer to process the data associated with the first and second confirmation points in order to confirm that the navigation unit has successfully completed the maneuver.

8. The navigation system in claim 2, wherein the set of confirmation points includes a first confirmation point and a second confirmation point, the first confirmation point positioned on the route before an intersection where there is an opportunity for the user of the navigation unit to leave the route, the second confirmation point positioned on the route after the intersection where there is the opportunity for the user of the navigation unit to leave the route.

9. The navigation system in claim 8, wherein the service center generates and transmits data to the navigation unit associated with the first confirmation point and the second confirmation point, the navigation unit having a microcomputer to process the data associated with the first and second confirmation points in order to confirm that the navigation unit has not left the route.

10. The navigation system in claim 1, wherein the data associated with the plurality of points further includes the identification of the type of point, the type of point being from a group consisting of at least a warning point, an instruction point, a confirmation point, and a destination point.

11. The navigation system in claim 1, wherein the navigation unit has a memory, the data associated with the plurality of points capable of being stored in the memory according to a series of records, each record corresponding to one of the plurality of points.

12. A method in a navigation system of sending data from a service center to a navigation unit, the method comprising the steps of:
sending data associated with a first set of points along a selected route, the first set of points reflecting warnings of upcoming maneuvers along the selected route;
sending data associated with a second set of points along the selected route, the second set of points reflecting instructions of upcoming maneuvers along the selected route; and
sending data associated with a third set of points along the selected route, the third set of points reflecting confirmations of maneuvers along the selected route.

13. The method in claim 12, further comprising the step of sending data associated with a fourth set of points along the selected route, the fourth set of points reflecting preparations of maneuvers along the selected route.

14. The method in claim 12, further comprising the step of sending data associated with a destination point, the data associated with the destination point including at least an identification of the type of point and a set of coordinates reflecting the location of the destination point.

15. The method in claim 12, wherein the data associated with the first, second, and third sets of points includes a set of coordinates reflecting the location of each point.

16. The method in claim 15, wherein the data associated with the first and second sets of points further includes at least one token number that represents a message to be outputted to a user of the navigation unit when the navigation unit falls within a predetermined radius of the set of coordinates for a particular point of the first or second set of points.

17. The method in claim 12, wherein the third set of points includes a first confirmation point and a second confirmation point, the first confirmation point positioned on the route before an upcoming maneuver on the route, the second confirmation point positioned on the route after the upcoming maneuver on the route.

18. The method in claim 12, wherein the third set of points includes a first confirmation point and a second confirmation point, the first confirmation point positioned on the route before an intersection where there is an opportunity for a user of the navigation unit to leave the route, the second confirmation point positioned on the route after the intersection where there is the opportunity for the user of the navigation unit to leave the route.

19. A method in a navigation system, the system having a service center and a navigation unit, the method comprising the steps of:
sending a starting point and a destination point to the service center;
selecting in the service center a route for the navigation unit based on the starting point and the destination point;
generating data in the service center associated with a first set of points on the route that correspond to warnings of maneuvers along the route;
generating data in the service center associated with a second set of points on the route that correspond to instructions of maneuvers along the route;
generating data in the service center associated with a third set of points on the route that correspond to confirmations of maneuvers along the route; and
sending the data associated with the first, second and third sets of points from the service center to the navigation unit.

20. The method in claim 19, further comprising the steps of:
generating data in the service center associated with a fourth set of points on the route that correspond to preparations of maneuvers along the route; and
sending the data associated with the fourth set of points from the service center to the navigation unit.

21. The method in claim 19, further comprising the steps of:
generating data in the service center associated with the destination point; and
sending the data associated with the destination point from the service center to the navigation unit.

22. The method in claim 19, wherein the data associated with the first, second, and third sets of points includes a set of coordinates reflecting the location of each point.

23. The method in claim 22, wherein the data associated with the first and second sets of points further includes at least one token number that represents a message to be outputted to a user of the navigation unit when the navigation unit falls within a predetermined radius of the set of coordinates for a particular point of the first or second set of points.

24. The method in claim 19, wherein the third set of points includes a first confirmation point and a second confirmation point, the first confirmation point positioned on the route before an upcoming maneuver on the route, the second confirmation point positioned on the route after the upcoming maneuver on the route.

25. The method in claim 19, wherein the third set of points includes a first confirmation point and a second confirmation point, the first confirmation point positioned on the route before an intersection where there is an opportunity for a user of the navigation unit to leave the route, the second confirmation point positioned on the route after the intersection where there is the opportunity for the user of the navigation unit to leave the route.

26. A method in a service center of a navigation system, the method comprising the steps of:
receiving a starting point and a destination point from a navigation unit;
selecting a route for the navigation unit based on the starting point and the destination point;
generating data associated with a first set of points on the route that correspond to warnings of maneuvers along the route;

generating data associated with a second set of points on the route that correspond to instructions of maneuvers along the route;

generating data associated with a third set of points that correspond to confirmations of maneuvers along the route; and sending the data associated with the first, second and third sets of points to the navigation unit.

27. The method in claim 26, further comprising the steps of:

generating data associated with a fourth set of points on the route that correspond to preparations of maneuvers along the route; and sending the data associated with the fourth set of points to the navigation unit.

28. The method in claim 26, further comprising the steps of:

generating data associated with the destination point; and sending the data associated with the destination point to the navigation unit.

29. The method in claim 26, wherein the data associated with the first, second, and third sets of points includes a set of coordinates reflecting the location of each point.

30. The method in claim 29, wherein the data associated with the first and second sets of points further includes at least one token number that represents a message to be outputted to a user of the navigation unit when the navigation unit falls within a predetermined radius of the set of coordinates for a particular point of the first or second set of points.

31. The method in claim 26, wherein the third set of points includes a first confirmation point and a second confirmation point, the first confirmation point positioned on the route before an upcoming maneuver on the route, the second confirmation point positioned on the route after the upcoming maneuver on the route.

32. The method in claim 26, wherein the third set of points includes a first confirmation point and a second confirmation point, the first confirmation point positioned on the route before an intersection where there is an opportunity for a user of the navigation unit to leave the route, the second confirmation point positioned on the route after the intersection where there is the opportunity for the user of the navigation unit to leave the route.

33. A navigation unit for use in a navigation system, the navigation unit comprising:

a wireless communication device for transmitting a starting point and a destination point to a service center and for receiving data from the service center that is associated with a plurality of points, the plurality of points including a set of warning points, a set of instruction points, and a set of confirmation points;

a first memory for storing the data associated with the plurality of points;

a second memory for storing messages;

an output for presenting messages stored in the second memory;

a microcomputer for processing the data associated with the plurality of points; and a global positioning system module for determining a current location of the navigation unit;

wherein the data associated the plurality of points includes a set of coordinates reflecting the location of each point, the microcomputer capable of comparing the current location of the navigation unit with each set of coordinates for the points.

34. The navigation unit in claim 33, wherein the first memory is configured to store the data associated with the plurality of point in a series of records, each record corresponding to one of the plurality of points.

35. The navigation unit in claim 33, wherein the data associated with the plurality of points further includes an identification of the type of point.

36. The navigation unit in claim 33, wherein the second memory is configured to store messages according to a plurality of token numbers, the token numbers used by the microcomputer to access the messages in the second memory when the current location of the navigation unit falls within a predetermined radius of the set of coordinates for a particular point.

37. The navigation unit in claim 33, wherein the output is an audio speaker in a vehicle.

38. The navigation unit in claim 33, wherein the data associated with the set of warning points and instruction points further includes at least one token number that represents a message that is accessed from the second memory and provided to the output when the current location of the navigation unit falls within a predetermined radius of the set of coordinates for a particular point of the warning or instruction points.

39. The navigation unit in claim 33, wherein the set of confirmation points includes a first confirmation point and a second confirmation point, the first confirmation point positioned on a route to the destination point before an upcoming maneuver on the route, the second confirmation point positioned on the route after the upcoming maneuver on the route.

40. The navigation unit in claim 33, wherein the set of confirmation points includes a first confirmation point and a second confirmation point, the first confirmation point positioned on a route to the destination point before an intersection where there is an opportunity for the user of the navigation unit to leave the route, the second confirmation point positioned on the route after the intersection where there is the opportunity for the user of the navigation unit to leave the route.

41. A navigation system comprising:

a navigation unit that is capable of transmitting a current location and a desired destination from a user; and a service center that is capable of receiving the current location and the desired destination and selecting a route between the current location and the desired destination, the service center being further capable of generating and transmitting data associated with a set of confirmation points on the selected route;

wherein the set of confirmation points includes a first confirmation point and a second confirmation point, the first confirmation point positioned on the route before an upcoming maneuver on the route, the second confirmation point positioned on the route after the upcoming maneuver on the route.

42. A navigation system comprising:

a navigation unit that is capable of transmitting a current location and a desired destination from a user; and a service center that is capable of receiving the current location and the desired destination and selecting a route between the current location and the desired destination, the service center being further capable of generating and transmitting data associated with a set of confirmation points on the selected route;

wherein the set of confirmation points includes a first confirmation point and a second confirmation point, the first confirmation point positioned on the route before an intersection where there is an opportunity for the user of the navigation unit to leave the route, the second confirmation point positioned on the route after the intersection where there is the opportunity for the user of the navigation unit to leave the route.

43. A method in a navigation system of sending data from a service center to a navigation unit, the method comprising the steps of:

sending a starting point and a destination point to the service center;

selecting in the service center a route for the navigation unit based on the starting point and the destination point;

generating data in the service center associated with a set of confirmation points along the selected route; and sending to the navigation unit the data associated with the set of confirmation points along the selected route;

wherein the set of confirmation points includes a first confirmation point and a second confirmation point, the first confirmation point positioned on the route before an upcoming maneuver on the selected route, the second confirmation point positioned on the route after the upcoming maneuver on the selected route.

44. The method in claim 43, wherein the data associated with the set of confirmation points includes a set of coordinates reflecting a location of each point.

45. The method in claim 44 further comprising the set of:

determining in the navigation unit whether the navigation unit has reached the location of the second confirmation point within a predetermined time limit after reaching the location of the first confirmation point.

46. The method in claim 44 further comprising the set of:

determining in the navigation unit whether the navigation unit has reached the location of the second confirmation point within a predetermined measured distance traveled after reaching location of the first confirmation point.

47. The method in claim 43, wherein the set of confirmation points further includes a third confirmation point and a fourth confirmation point, the third confirmation point positioned on the route before an intersection where there is an opportunity for a user of the navigation unit to leave the route, the fourth confirmation point positioned on the route after the intersection where there is the opportunity for the user of the navigation unit to leave the route.

48. A method in a navigation system of sending data from a service center to a navigation unit, the method comprising the steps of:

sending a starting point and a destination point to the service center;

selecting in the service center a route for the navigation unit based on the starting point and the destination point;

generating data in the service center associated with a set of confirmation points along the selected route; and sending to the navigation unit the data associated with the set of confirmation points along the selected route;

wherein the set of confirmation points includes a first confirmation point and a second confirmation point, the first confirmation point positioned on the route before an intersection where there is an opportunity for a user of the navigation unit to leave the route, the second confirmation point positioned on the route after the intersection where there is the opportunity for the user of the navigation unit to leave the route.

49. The method in claim 48, wherein the data associated with the set of confirmation points includes a set of coordinates reflecting a location of each point.

50. The method in claim 49 further comprising the set of:

determining in the navigation unit whether the navigation unit has reached the location of the second confirmation point within a predetermined time limit after reaching the location of the first confirmation point.

51. The method in claim 49 further comprising the set of:

determining in the navigation unit whether the navigation unit has reached the location of the second confirmation point within a predetermined measured distance traveled after reaching the location of the first confirmation point.

* * * * *